TO FIG. 2

STATION 1

INVENTOR.
EARL RADFORD EVANS
BY John J. Rogan
ATTORNEY

STATION 1

INVENTOR.
EARL RADFORD EVANS
BY John J. Rogan
ATTORNEY

June 10, 1952 E. R. EVANS 2,599,904

MULTISTATION SELECTIVE COMMUNICATION SYSTEM

Filed Sept. 15, 1948 13 Sheets-Sheet 3

STATION 2

INVENTOR.
EARL RADFORD EVANS
BY John J. Rogan
ATTORNEY

STATION 2

INVENTOR.
EARL RADFORD EVANS
BY
John J Rogan
ATTORNEY

June 10, 1952 E. R. EVANS 2,599,904

MULTISTATION SELECTIVE COMMUNICATION SYSTEM

Filed Sept. 15, 1948 13 Sheets-Sheet 5

STATION 3

INVENTOR.
EARL RADFORD EVANS
BY John J. Rogan
ATTORNEY

STATION 3

INVENTOR.
EARL RADFORD EVANS
BY
John J. Rogan
ATTORNEY

STATION 4

INVENTOR.
EARL RADFORD EVANS
BY John J. Rogan
ATTORNEY

June 10, 1952 E. R. EVANS 2,599,904

MULTISTATION SELECTIVE COMMUNICATION SYSTEM

Filed Sept. 15, 1948 13 Sheets-Sheet 8

STATION 4

INVENTOR.
EARL RADFORD EVANS
BY John J. Rogan
ATTORNEY

STATION 5

INVENTOR.
EARL RADFORD EVANS
BY John J. Logan
ATTORNEY

June 10, 1952 E. R. EVANS 2,599,904

MULTISTATION SELECTIVE COMMUNICATION SYSTEM

Filed Sept. 15, 1948 13 Sheets-Sheet 10

STATION 5

INVENTOR.
EARL RADFORD EVANS
BY John J. Rogan
ATTORNEY

MULTISTATION SELECTIVE COMMUNICATION SYSTEM

Filed Sept. 15, 1948 13 Sheets-Sheet 11

INVENTOR.
EARL RADFORD EVANS
BY
John J. Rogan
ATTORNEY

INVENTOR.
EARL RADFORD EVANS
BY
John J. Logan
ATTORNEY

INVENTOR.
EARL RADFORD EVANS
BY John J. Rogan
ATTORNEY

Patented June 10, 1952

2,599,904

UNITED STATES PATENT OFFICE 2,599,904

MULTISTATION SELECTIVE COMMUNICATION SYSTEM

Earl Radford Evans, Jackson Heights, N. Y., assignor to Times Facsimile Corporation, New York, N. Y., a corporation of New York Application September 15, 1948, Serial No. 49,425

22 Claims. (Cl. 250—6)

This invention relates to signalling systems and more particularly to a multi-station selective radio system employing facsimile or printing telegraph communication equipment.

In general terms the object of the invention is to provide an improved radio signalling system for effecting transmission of a message and automatic recording of the message at selected stations.

Another object of the invention is to provide an improved multi-station system of radio communication embodying selective message recording at one or more of the stations, the remaining stations being disabled from recording a message unless selected by the transmitting station.

Another object of the invention is to provide, in a multi-station radio-channel printer system, an improved arrangement for rendering certain of the stations inoperative under the control of the transmitting station, to limit reception of messages to designated stations of the system and to limit transmission to a single transmitter so that a single-frequency carrier channel can be used.

Another object of the invention is to provide an impdoved multi-station radio signalling system arranged for non-interfering transmission between any of the stations on a single signalling frequency or carrier wave.

A further object of the invention is to provide an improved radio signalling system of the message-recording type wherein the transmission of a message is effected automatically, the recorder being started, rendered effective for recording the message and the radio channels released at the end of the message without attention from the operators at the transmitting and receiving stations after starting the transmitter.

A further object of the invention is to provide a multi-station radio signalling system with improved means for selecting the wanted station or stations to receive the message and, if desired, for indicating at the transmitting station which receiving stations have been selected.

In connection with multi-station printing telegraph or facsimile systems employing regular telegraph circuits or direct-current channels, the term "broadcasting" has been used to describe a syetem in which a message can be sent simultaneously to two or more receiving stations. In these prior systems the problem of starting up the recorder or receiving printer, indicating the busy or idle condition of the system and releasing the circuit at the end of the transmission is simplified by the fact that a metallic circuit or the equivalent is available between stations. Usually the current flow in the circuit is interrupted or the polarity of the applied voltage reversed to control the various functions required to effect the recording of a message and the seizure and release of the circuit facilities. Obviously such arrangements cannot be applied to signalling channels involving space radio facilities operating with radio frequency waves or even alternating-current carrier channels operating on wire circuits at lower frequencies, unless separate control channels are provided. Another feature of the present invention therefore relates to systems adapted for automatic control of facsimile or printing telegraph equipment operating over radio or low-frequency carrier channels and adapted for broadcasting from any one of a plurality of transmitters to a plurality of receiving stations over a single carrier channel. While the fact that the invention can utilize radio-frequency or carrier-frequency channels for facsimile or printer broadcasting is an advantage, certain features may be used in systems employing regular printing telegraph channels.

Still another feature of the invention relates to a selective switching system for multi-station operation of facsimile or printing telegraph equipment which avoids the use of marginal or code-selection equipment which has been found unreliable for use on radio channels.

In accordance with a preferred form of the invention, a plurality of stations are each provided with automatic message transmitting and recording equipment; i. e., apparatus of such character that the transmitter, when properly loaded with message copy, is arranged to start up, control and release one or more message recorders. The message transmitters and recorders are preferably of the facsimile type. Each station is also provided with transmitting and receiving apparatus for sending and receiving message and control signals by modulation and detection or demodulation of a radio or carrier-frequency wave. In the preferred embodiment of the invention, all stations are adapted to transmit and receive on the same carrier frequency, the carrier being off intermittently or continuously during the idle period when no message is being transmitted. Each station is further provided with a synchronized rotary selector switch, the contacts of the switch being normally latched in a "home" position and driven at a uniform speed over the bank contacts of the switch whenever they are released during the initial control period of the transmission. All radio and facsimile receivers are normally conditioned for immediate transmission or reception in response to a control function, so that when one of the stations desires to transmit a message, the carrier can be turned on and the wanted station or stations selected by the transmission of timed impulses. Then the selected facsimile recorder or recorders are started and phased automatically and the radio channels restored to the idle condition at the end of the transmission. The transmission of the timed control impulses and the corresponding functions at the receiving station are effected by the synchronized switches without using coded impulses. If two or more stations attempt to transmit at or about the same time, only one of the transmitter stations is conditioned for operation, the others being locked out until completion of the message. Since the application of the invention is described in terms of radio transmission, preferably the system includes means for confirming the selection of a wanted station, indicating to the transmitting operator that the station has been selected and is within range of communication.

If desired, the system may be modified at one station so that such station will receive all messages transmitted, and thus serves as a monitoring station for the system. The main or monitoring station might, for example, be located at the ground headquarters station of a military installation or airline, where the other substations are located in planes.

In the accompanying drawings showing a preferred embodiment of the invention, Figs. 1 to 10 inclusive are schematic circuit diagrams of a communication system including a main or monitoring station and four substations;

*General description of system*

Figure 1:
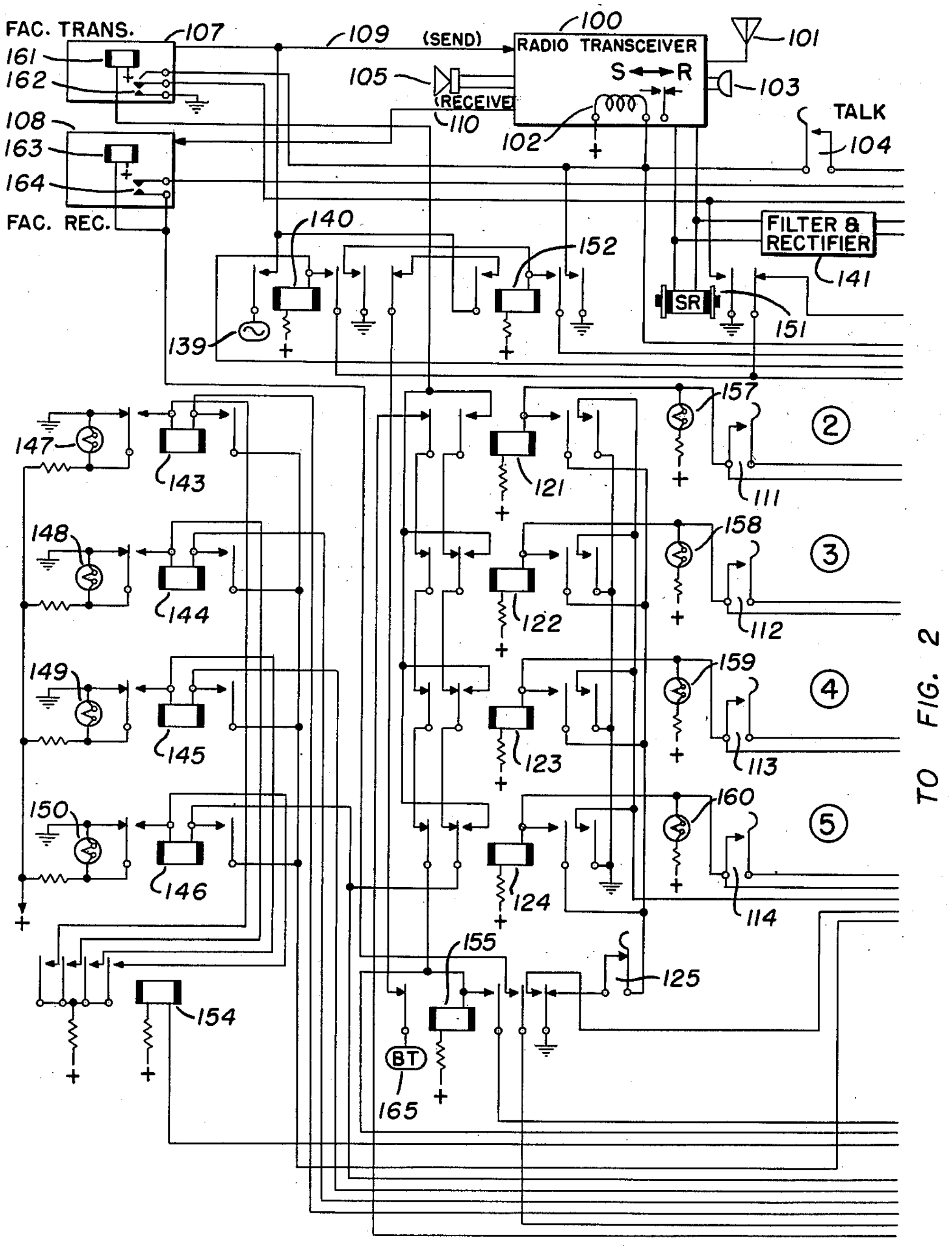
Figure 2:
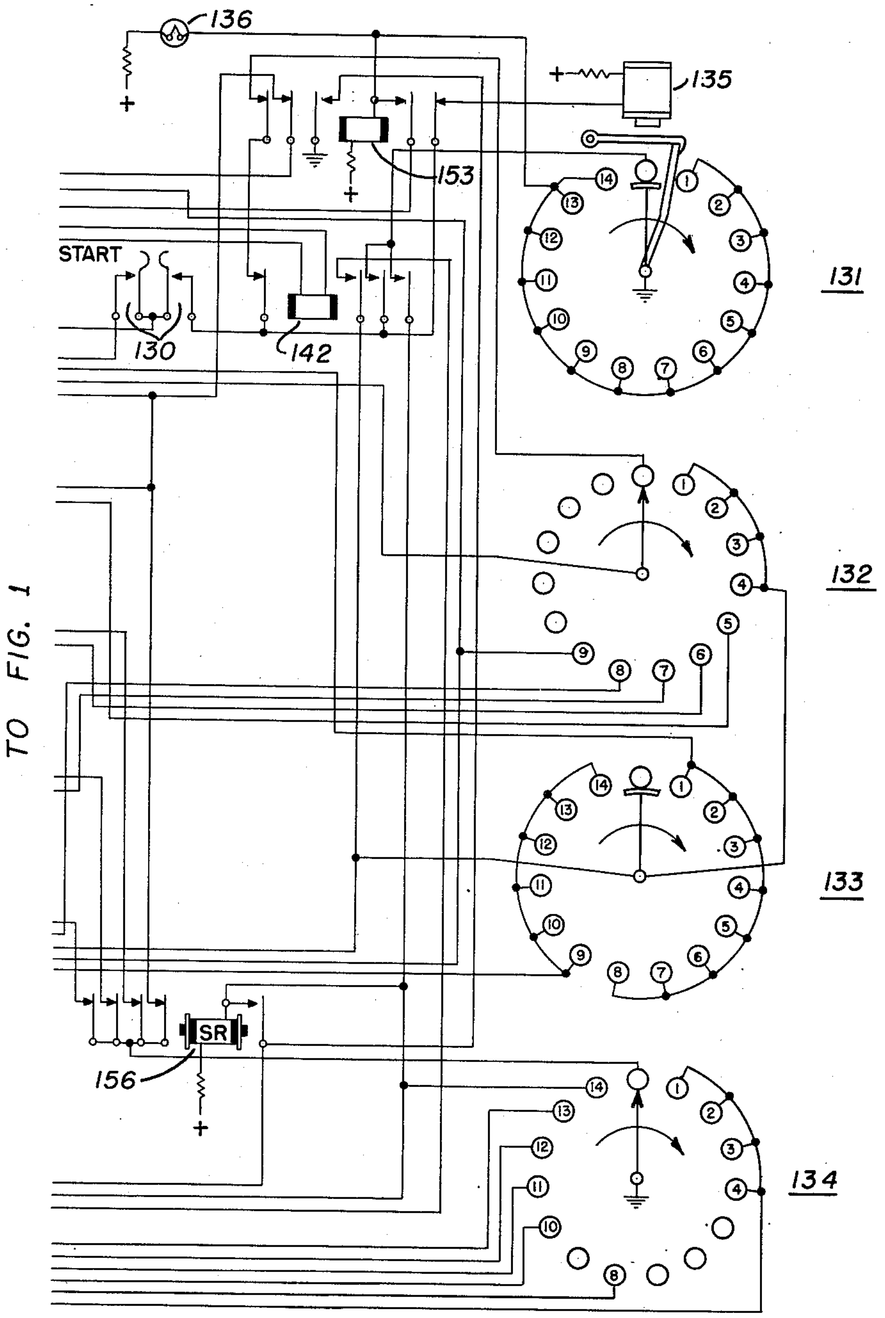
Figure 3:
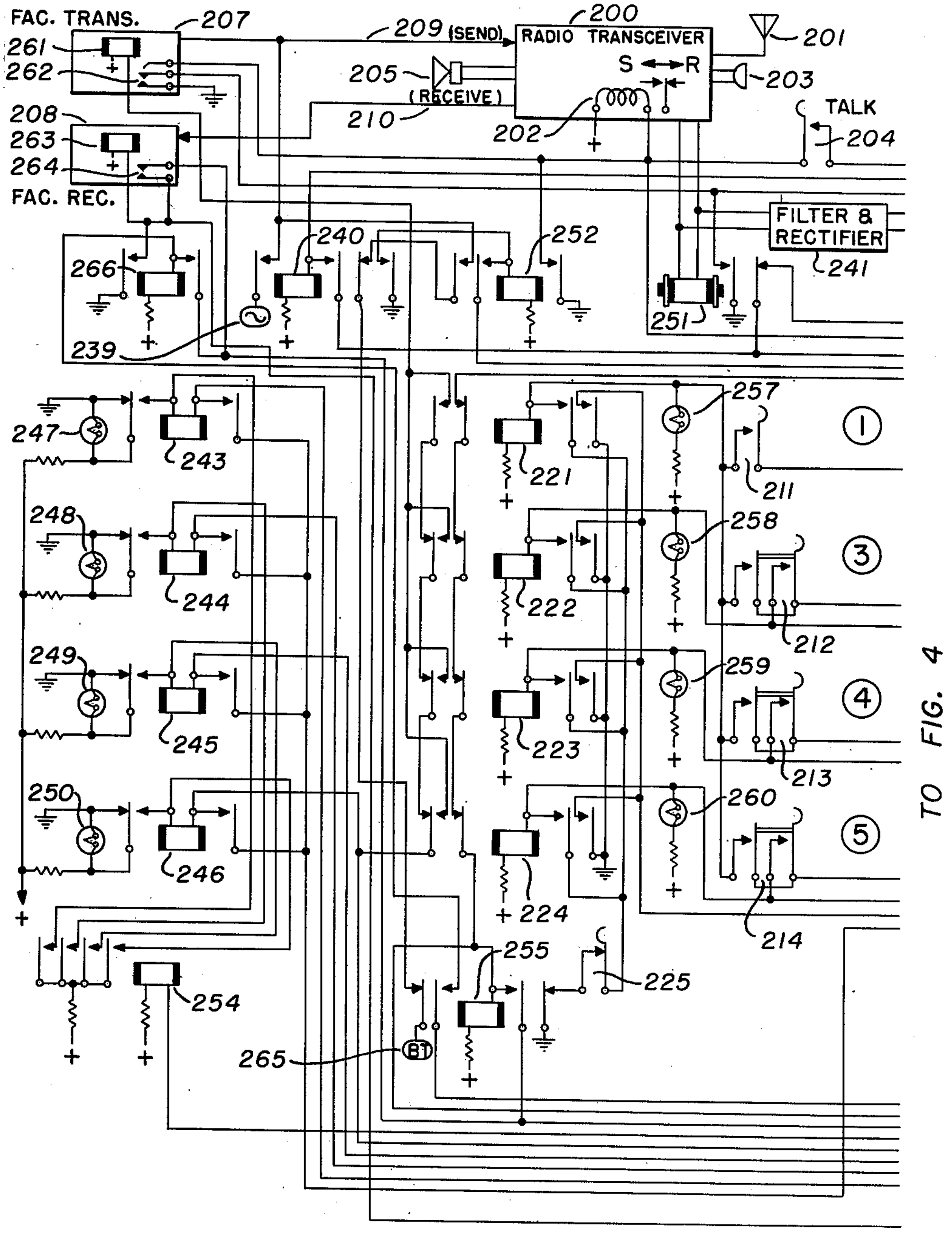
Figure 4:
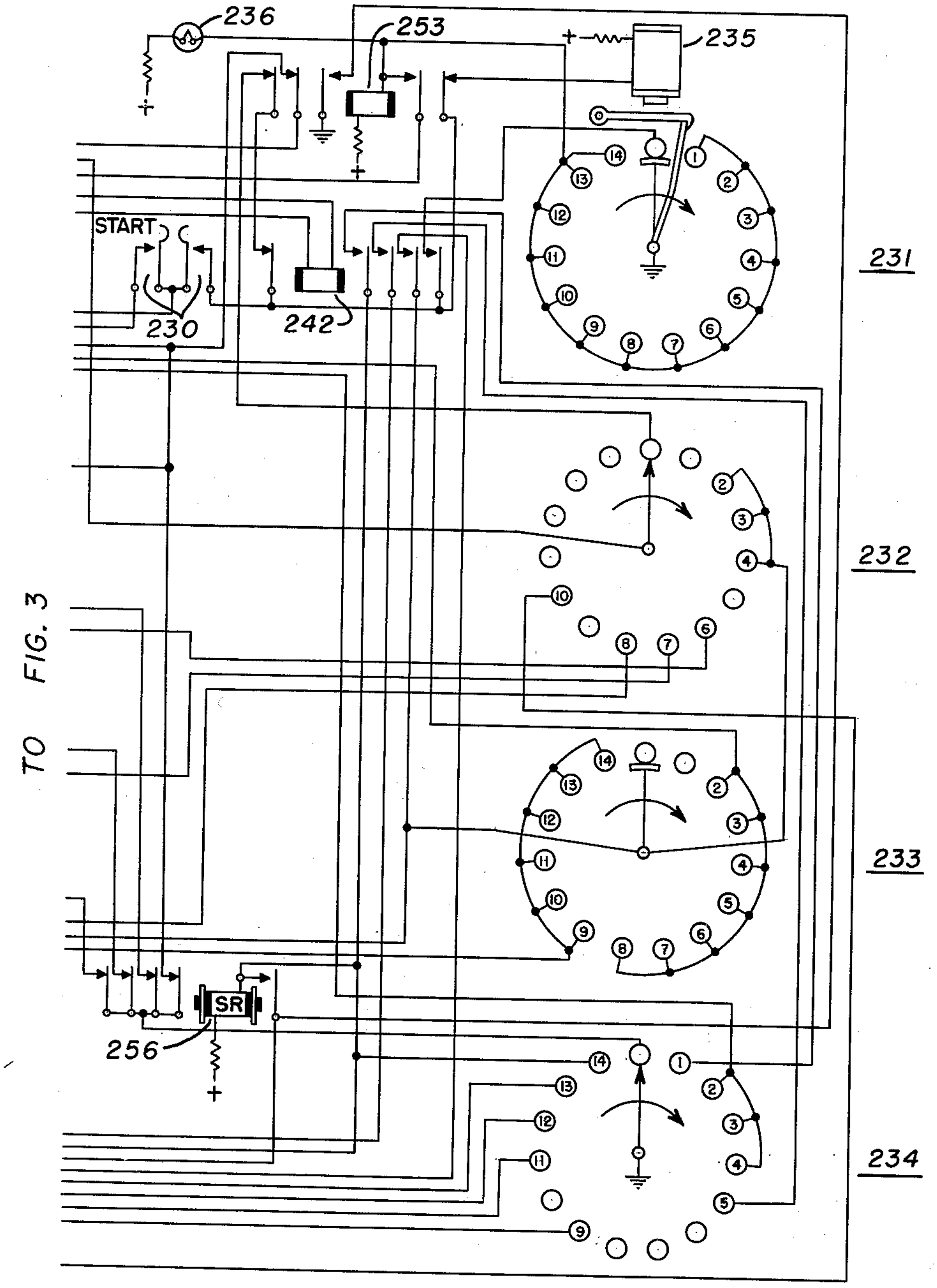

Figs. 1 to 10 inclusive illustrate the circuits at stations 1 to 5, Station No. 1 being shown in Figs. 1 and 2; Station No. 2 in Figs. 3 and 4, etc. As shown, the system comprises five stations but it should be understood that more stations could be added by the addition of circuits similar to those shown, and also that additional stations having the same numbers on the selection plan can be operated during any broadcast transmission; i. e., more than one Station No. 1, 2, 3, 4, or 5.

Figs. 11 to 18 illustrate details of construction of typical facsimile telegraph apparatus which may be used, by way of example. However the invention resides in the control features of the communication system and only so much is shown of the radio and telegraph equipment as is necessary to an understanding of the invention.

Referring again to Figs. 1 and 2, the equipment at station 1 comprises a radio transceiver 100 provided with a conventional antenna 101 of any suitable type. Transceiver 100 is arranged to transmit and receive on the same radio frequency carrier channel, with the other transceivers of the system having the same operating channel frequency. Preferably and as described hereinafter, no carrier is radiated by any transceiver until the operator at one station desires to transmit and at this time the transmitted signals will be received by all of the other stations which are within transmitting range. The radio transceiver 100 comprises means such as a relay 102 for radiating a carrier when desired, the transmitter or its connection with the radiator 101 being normally inoperative in accordance with usual practice. Preferably also the transceiver is provided with conventional telephone equipment including a microphone 103, a press-to-talk switch 104 and a reproducer 105 for voice communication, although this voice-communication equipment may be omitted if desired in a message-recording system according to the invention.

For the purpose of illustrating the invention, a facsimile transmitter 107 and a facsimile recorder 108 are shown which are operatively connected to transceiver 100 by the conductors 109 and 110 respectively. Other message recording apparatus such as printing telegraph equipment or the like may be substituted for the facsimile equipment, but the latter is preferred because of its capability of unattended operation and because of the limitations of radio channels in transmitting code signals without errors as compared with facsimile signals. Consequently certain features of the system permit the use of a facsimile transmitter and recorder, similar to those employed at the present time for nonselective station operation.

In accordance with the invention, the system provides for the selection of any of the stations at which it is desired to record a message, the locking out of the unwanted stations, an answer-back signal indicating that the wanted station or stations are within range and conditioned for operation, automatic transmission and recording of the message from the transmitting station, and release of the radio frequency channel for subsequent use by another station. At station 1, four selecting keys 111, 112, 113 and 114 are provided for selecting any of the other stations 2 to 5 to which it is desired to transmit a message. The operation of selecting keys 111 to 114 actuates the associated selection relays 121 to 124 respectively. Each of said selection relays when operated locks up to ground through the contacts of a control key 125 so that if the wrong selecting key is operated by mistake, the selection can be released by the operation of the key 125, and the correct keys operated. When the selection has been set up, operation of a start key 130 initiates the operating cycle of a rotary control switch at the transmitting station and the corresponding synchronized switch at each of the remote stations. As shown by way of example, each control switch comprises four levels or banks 131 to 134 of fifteen contacts each and moveable switch wipers adapted to traverse the contact banks at constant speed whenever the wipers are released by operation of a latch magnet 135. As shown, the wipers associated with the bank contacts of levels 131 and 133 are of the bridging type. The wipers may, for example, be driven by clockwork or a motor which is controlled by the constant-speed mechanism of the facsimile equipment, or the wipers may be driven at constant speed through a slip-friction clutch directly from the facsimile motor drive of the type in general use. The corresponding elements of an identical switch at station 2 are indicated at 231 to 235 respectively, and similar switches are provided at the other stations. The control circuits are so arranged that when the start key at any one of the stations is operated, all of the control switches are released by a control signal pulse and, being driven at the same speed, close circuits to corresponding bank contacts simultaneously to effect certain control functions at each station.

In order to avoid false operation on received pulses of a type likely to be caused during normal operation or result from atmospherics, a tone generator 139 is provided which, for example, may generate a special control signal such as a 1000-cycle tone chopped at the rate of 20 times a second, or a cyclically varied signal as described in the patent to Espenschied et al., No. 1,464,565, dated Aug. 14, 1923. The radio transceiver 100 radiates this control signal whenever relay 140 operates. At the other stations the received signal is selected by the filter and rectifier unit corresponding to unit 141 and impressed upon the associated control relay 142 (or 242, etc.). When one of the stations initiates transmission by operating the start key 130, this tone signal causes relays corresponding to relay 142 at the other stations to operate whereupon the latch magnets 235 and so forth are energized to release the associated switch wipers at all stations for one revolution.

The respective levels of the rotary control switch are divided into three groups in addition to the home (normally closed) contacts. Contacts 1, 2, 3 and 4 are provided for the purpose of locking out the transmitting and selecting apparatus at all of the stations except one transmitting station. In order to prevent more than one transmitter operating at the same time in the case of simultaneous operation of the start keys at two or more stations, the system is arranged to lock out stations 2 to 5 if station 1 is transmitting, and lock out stations 1 and 3 to 5 if station 1 is not transmitting, but station 2 has commenced the transmitting cycle, and so forth. If more than one station attempts to transmit at the same time, station 1 has priority over stations 2 to 5, station 2 over stations 3 to 5 and so forth, and only one station will be conditioned for sending a message even though more than one attempts to initiate transmission at the same time.

The second group of contacts consisting of contacts 5, 6, 7 and 8 are employed for the purpose of rendering the selected stations operative to record a transmission, those not selected being locked out except in the case of the main station 1. Station 1 is different from the other stations in that it is a monitoring station and may be located in the control tower or other ground radio station where stations 2 to 5 are airborne. For this purpose, the system is so arranged that station 1 will copy all messages transmitted by the remaining stations whether selected or not. If desired, all stations can be similar to station 2 which only records a message when selected by the transmitting station.

The remaining switch contacts of the control switches are employed for the purpose of controlling the transmission of an answer-back signal from the selected station or stations and for initiating the operation of the facsimile transmitter or recorder at the associated station. This answer-back feature provides an indication to the transmitting operator that each of the selected stations is within range and conditioned for operation, and such additional feature may be omitted if desired without departing from the scope of the invention insofar as the general selection control features are concerned. If station 1 is transmitting, and an answer-back signal is received from station 2, 3, 4, or 5, the corresponding relay 143, 144, 145 or 146 is operated to light the associated answer-back signal lamps 147 to 150. The system further includes a slow-release relay 151 connected to the receiver element of the radio transceiver 100 so as to be energized whenever a radio frequency carrier is received from another station. Relay 152 is arranged to turn on the carrier of the transceiver 100 whenever relay 140 operates. Auxiliary relays 153, 154, 155 and 156 are also provided, the purpose of which will be explained. If desired, signal lamps 157 to 160 may be provided adjacent the selecting keys to indicate which keys have been operated.

The facsimile transmitter 107, after first being loaded with a transmission blank containing a message to be transmitted, starts and completes its transmitting cycle in response to the energization of magnet 161 as will be explained in connection with Figs. 11 to 15. The transmitter 107 further includes contacts 162 which remain closed during the facsimile transmitting period. Facsimile recorder 108 may be of the continuous type which starts up automatically upon the energization of a start relay or magnet 163 and is provided with contacts 164 which are closed during the facsimile receiving period and then opened manually or automatically. If the system is not in use for facsimile transmission and no radio frequency carrier is being radiated from any station, voice communication can be effected by closing the press-to-talk key 104. The closure of said key closes a circuit through the coil 102 and the contacts of relays 153 and 156 to ground at the home contact and wiper of bank 134 of the rotary control switch. The operation of relay 102 turns on the carrier of transceiver 100 and said carrier is modulated by the microphone 103 to transmit phone messages to the other stations. However, as soon as the transmission of a facsimile message is initiated by operating the start key 130, the above-described circuit of relay 102 is interrupted either at the contacts of relay 153 or relay 156 or the switch bank 134 and if desired, the microphone 103 is also disabled. Similarly, the voice communication equipment at the other stations is disabled as soon as the facsimile transmission is initiated. At the end of the transmission of the message, the facsimile equipment and the selection equipment are restored to normal and the voice communication equipment is again operative. The receiving elements of the radio transceivers at all stations are normally operative when the system is not in use and all radio carriers are shut off. It should be noted, however, that by combining the facsimile communication equipment with the voice communication equipment, not only is record communication available when desired, i. e. a permanent record of the message is obtained, but also the difficulty incurred when two or more stations attempt to talk at the same time is eliminated by recourse to facsimile transmission.

*Detailed description of system*

The operation of conventional voice communication equipment as an incidental feature of the system having been described above, the following is a description of the control features as related to the facsimile apparatus shown in Figs. 1 to 10.

Assuming that the operator at station 1 (Figs.

1 and 2) desires to transmit a message to one or more of the other stations, the wanted stations are selected by the non-locking selecting keys 111, 112, 113 and 114 representing stations 2, 3, 4 and 5 respectively. When the key 111 is actuated, a circuit is closed from ground through the wiper and home contact of the level 134 of the rotary switch, the inner left hand armature and back contact of relay 156, the key 111 and the winding of relay 121 to battery, whereupon the selection relay 121 becomes energized. Similarly the operation of the other selecting keys energizes the corresponding selection relays 122, 123 or 124, and any of said relays which is operated becomes locked up through a circuit including its inner right hand armature and front contact and the normally closed contacts of the reset key 125 to ground at the outer armature and back contact of relay 155. Therefore the selection relays 121 to 124 remain operated after the non-locking selecting keys are released. As shown, the locking ground on each of said relays is employed to light an associated indicator lamp 157—160 to indicate the selection which has been made. If the wrong selecting key is actuated accidentally, the selection can be released by actuating the reset key 125 to open the locking circuits of relays 121—124.

After selection of the wanted station or stations by actuation of the selecting keys 111 to 114, and assuming that the facsimile transmitter 107 has been loaded with the message to be transmitted, a "start" key 130 is actuated to initiate the remote control and transmission cycle. When said key is actuated, a circuit is closed from ground through the wiper and home contact of the level 134 of the rotary switch, the inner left hand armature and back contact of relay 156, the right hand contacts of the relay 151 and the start key 130, and the right hand outer armature and back contact of relay 153 for energizing the control switch release magnet 135, whereupon the rotary control switch comprising the four levels or banks 131—134 is released for one revolution at a constant speed equal to that of the synchronized rotary control switches at the other stations. Each of said switches is driven, when unlatched, by conventional motor drive means which may be controlled in speed by the constant synchronous drive of the facsimile transmitter or by a synchronous or clock motor as commonly used for such drives.

The control switches at the other stations are simultaneously released with that at station 1 by transmission of a signalling or control pulse when the start key 130 is operated. This start pulse is transmitted from the signalling source 139 as described above in response to the operation of relay 140. The signalling or start impulse is impressed upon the radio channel whenever relay 102 of the radio transceiver is operated to connect the carrier source to the antenna 101, and the relay 140 operated to connect the tone source 139 to the conductor 109 connected to the transmitting element of the transceiver 100. When the start key 130 is operated as above described, a circuit is closed from ground at level 134 through the above-described circuit to the movable contact of the start key 130, and the left hand make contact of said key for operating the relay 102 to the "send" position. At the same time a circuit is closed from ground through the right hand make contact of the key 130, the left hand armature and back contact of relay 142, the left hand outer armature and back contact of relay 153, the wiper and home contact of level 132 of the control switch and the winding of relay 140 whereupon said relay becomes energized and the radio transceiver 100 transmits a control pulse over the radio-frequency channel for initiating the operation of the rotary control switches at all of the other stations, as will be described hereinafter. The relay 140 becomes locked up through its right hand inner armature and front contact through a circuit that is independent of the contacts of the start key 130 so that the relay remains locked up until the wiper of the level 134 of the control switch leaves its home contact, whereby a control signal impulse of uniform length is insured. Also the locking ground potential for the relay 140 is impressed upon the release magnet 135 through the above-described energizing winding of relay 140 so that the magnet receives a definite operating current of sufficient duration to insure its operation even though the start key 130 is actuated and released quickly. The operation of relay 140 closes a circuit through its middle right hand armature and front contact for energizing relay 152.

The operation of relay 152 holds transceiver relay 102 to the "send" position whenever relay 140 is operated. As soon as the switch wiper of level 133 engages the #1 contact, relay 152 becomes locked up through its right hand inner armature and front contact, the said switch wiper and the right hand outer armature and front contact of any operated one of the selection relays 121—124 to ground. Since the bank contacts #1-8 of level 133 are multipled, relay 152 remains locked up through the above-described circuit until the bridging wiper of level 123 leaves the #8 bank contact. During this period, whenever relay 140 becomes de-energized, relay 152 maintains the radio carrier on and connects a "busy" tone from the source 165 to the transmitting section of the radio transceiver 100.

If the start key 130 is operated to initiate transmission from station 1 while the carrier frequency is being transmitted from one of the other stations, the start circuit described is opened by the operation of the carrier-responsive relay 151. Thus the start circuit at station 1 is inoperative until the system is idle, as indicated by the absence of a carrier. On the other hand, if one of the selection keys 111—114 is operated and another station transmits a control pulse to initiate the transmitting cycle before the selection is completed and key 130 operated, the operation of pulse relay 142 closes a circuit through its right hand outer armature and front contact for operating relays 155 and 156, whereupon the operating and locking circuits of the selecting relays 121—124 are opened to render the selection at station 1 inoperative. When the control switch wipers reach the #1 bank contacts, a circuit is closed at level 131 for operating relay 153. Since relay 156 is slow-to-release, it becomes locked up through its right hand armature and front contact to ground at the inner left hand armature and front contact of relay 153, thus preventing re-operation of the selecting relays 121—124.

Since it is assumed however that station 1 is transmitting, a control signal pulse from the source 139 is transmitted on the radio-frequency carrier wave radiated from transceiver 100 when the contacts or wipers of the control switch engage the #1 bank contacts. At this time the circuit of relay 140 may be traced through the wiper and #1 contact of the level 132 of the switch to ground at the right hand outer armature and front contact of any of the selection relays 121 to 124 which have been operated. Obviously if station 1 is not transmitting, none of the selection relays 121 to 124 will be operated and in that event no signal pulse will be sent out at this time. The transmission of a pulse over the radio channel when the switch wipers engage the #1 contacts of the control switch is utilized to lock out the other stations and to disable the transmitting apparatus of any other station which may have been preparing to transmit simultaneously with station 1. If, however, station 1 is not transmitting and no pulse is sent out at this time, when the switch wipers engage bank contacts #2 of the control switch, station 2 sends out a control pulse if it is ready to transmit, as will be explained in connection with Figs. 3 and 4. Similarly stations 3 and 4 are given an opportunity to lock out the remaining stations by transmitting a control pulse when the switch wipers engage contacts #3 and #4 of the rotary switch if stations 1 and 2 are not transmitting.

However, if it is assumed that station 1 is transmitting and a control pulse is sent out as described when the switch wipers engage the #1 bank contacts, this pulse is also repeated when the switch wiper of bank 132 engages the contacts #2, #3 and #4 which are wired in multiple with #1. During the first step of the rotary switch it will be noted that the circuit of the control switch release magnet 135 is interrupted by the operation of relay 153 so that the latch of the release magnet is in readiness to stop the rotation of the switch wipers when the wipers have made one complete revolution. The circuit of relay 153 may be traced through the bank contacts of level 131 of the rotary switch to ground on the wiper, and since said bank contacts are connected in multiple and the wiper contact is of the bridging type as shown, the relay 153 remains operated while the switch wipers are making a complete revolution. After the wipers of the switch have completed a revolution, the operating circuit of relay 153 is opened by the switch wiper of the level 131 but said relay remains locked up through a circuit including its inner right hand armature and front contact and the contacts 162 of the facsimile transmitter 107 which remain closed until the transmission of the message has been completed. When station 1 is receiving, relay 153 likewise remains locked up to ground at the right hand armature and front contact of slow-release relay 151 which is connected to the radio receiver to be operated as long as the radio-frequency carrier is received from any of the remote stations which are transmitting. A busy lamp 136 is shown connected to the circuit of relay 153 in parallel with the operating winding thereof so that the lamp is lighted whenever the transmission system is in use, either by station 1 or any of the other stations, and until the radio-frequency carrier is cut off during the idle condition of the system.

Assuming that the switch wipers of the rotary control switch have passed over the bank contacts #1 to #4 as described above, when the wiper of level 132 engages contacts #5, #6, #7 and #8, control pulses are sent out from the radio transmitter to select the recording equipment of stations 2, 3, 4 and 5 if the corresponding selecting keys 111, 112, 113 and 114 have been operated. The transmission of each pulse results from the operation of relay 140 as set forth above, the circuit of said relay being closed through the wiper of level 132 of the control switch, bank contact #5 and the inner right hand armature and front contact of relay 121 to ground at the outer armature and back contact of relay 155, if relay 121 had been operated by the selecting key 111. The bank contacts #6, #7 and #8 of level 132 are similarly connected to the selection relays 122, 123 and 124 to cause the transmission of a signalling control pulse from the source 139 and transceiver 100 when the wiper of level 132 engages said contacts provided said selection relays have been energized by operation of the associated selecting keys. The manner in which said control impulses transmitted at the proper time actuate the control equipment at the remote stations will be described in connection with the detailed description of such stations. Station 1 as stated above is the main or monitor station which is arranged to record all messages transmitted by any of the other substations so that no selecting function is required in connection with its facsimile recorder 108 except that the same is rendered operative during every transmitting cycle provided the facsimile transmitter 107 is not being used to transmit a message from station 1.

Figures 16, 17:
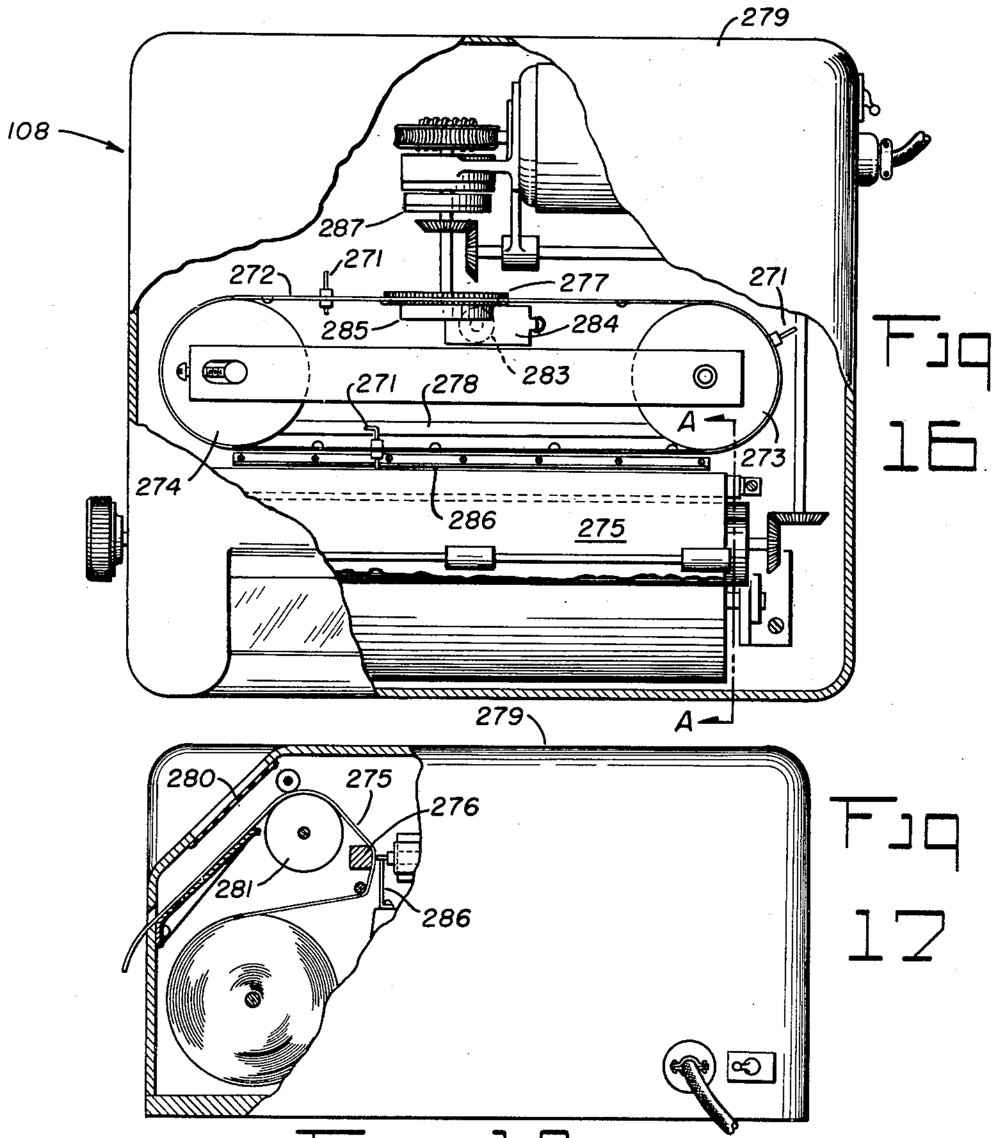
Figs. 16 and 17 illustrate generally a preferred form of recorder of the continuous strip type.
Figure 18:
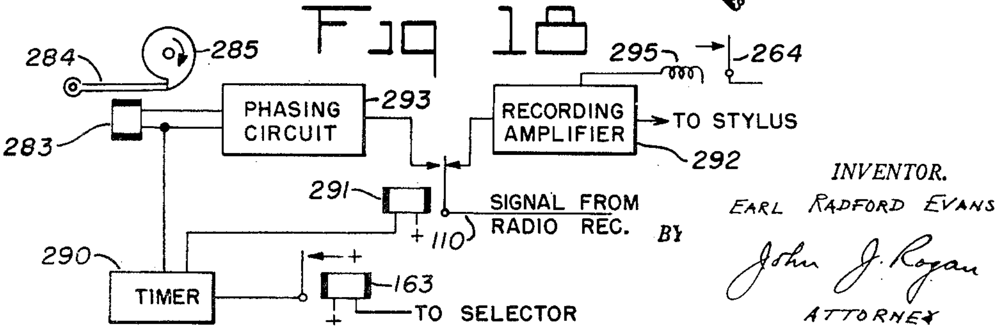
Fig. 18 is a schematic diagram of the control circuits of the recorder.

When station 1 is not initiating transmission of a message, a circuit is closed through the wiper of level 134 of the control switch and the bank contacts #1, #2, #3 and #4, the outer left hand armatures and back contacts of relays 121 to 124 in series and the windings of relays 155 and 156 in parallel to operate said relays. Relays 155 and 156 become locked up to ground through their right hand inner armatures and front contacts and the left hand inner armature and front contact of relay 153, and thus remain operated during the remainder of the transmitting cycle. At its outer armature and back contact, relay 155 opens the locking circuits of the selection relays 121 to 124. Similarly slow-release relay 156 opens the circuits to the key switches 111—114 and 130, and maintains them open until after the facsimile transmission is finished. When during the recording cycle at station 1 the switch wiper of level 134 engages bank contact #8 a circuit is closed from ground through said contact, the middle right hand armature and front contact of relay 155 and the operating magnet 163 of the facsimile recorder 108 to initiate the recording operation. The detailed construction of facsimile recorder 108 is shown in Figs. 16–18 and will be described hereinafter.

Thus if the operator at station 1 has not initiated a transmission, the recorder 108 is rendered operative by relay 155 when any of the other stations commences to transmit a message. Since all transceivers 100, 200 and so forth operate on the same carrier, the facsimile recorder 108 is effective to record all messages transmitted from the other stations.

The last group of contacts #9–14 of the rotary control switch is employed for sending an answer-back signal from the selected stations which have been conditioned for recording a message; and for starting up the transmitter at the transmitting station and the recorder at the selected station or stations (except station 1). When station 1 is conditioned for recording as described above, a control impulse is sent out from the radio transmitter at said station when the switch wipers engage the #9 contacts to indicate to the other station which is transmitting that station 1 is within operative range and conditioned for reception. Similarly, an answer-back control pulse is sent out from station 2 (if selected) when the wipers engage the bank contacts #10, station 3, on #11, and so forth, as will be described in connection with Figs. 3–10. The circuit of relay 140 which is closed to send out the answer-back signal from station 1 may be traced through the wiper of level 132 and the #9 bank contact to ground at the outer armature and front contact of relay 155, which was energized when the switch wipers engaged bank contact #1 as described above (station 1 not transmitting). This circuit of relay 140 is not closed when station 1 is transmitting since the above-described circuit of relay 155 is open at the contacts of any energized selection relays 121 to 124.

In this case the facsimile transmitter 107 is started up when the wiper of level 134 engages the #13 bank contact through a circuit which may be traced through said contact, the inner left hand armature and front contact of any energized selection relay 121 to 124 and the operating magnet 161 of the facsimile transmitter 107. In the meantime as the wipers of the control switch traverse the contacts #10 to #13, ground is applied through said contacts and the wiper of level 134 successively to the windings of the answer-back relays 143, 144, 145 and 146. The circuits of said relays are open, however, unless battery is applied to the opposite sides of said windings through the contacts of the auxiliary relay 154 which is connected to be operated by pulse relay 142 controlled by the reception of a control pulse by the receiver of radio transceiver 100 when said pulse is transmitted from a remote station which has been conditioned for recording. If station 2 has been selected by station 1 and is within transmitting range, it transmits a signal pulse over the radio channel when the wipers of the control switches are in engagement with bank contacts #10 as described above in connection with bank contact #9 at station 1, said control impulse being filtered and rectified in the detector unit 141 and utilized to operate relay 142. When relay 142 is energized, the circuit of relay 154 is closed through the right hand outer armature and front contact of any energized selection relay 121 to 124, whereupon relay 154 operates as the switch wipers pass over the #10 bank contacts in response to the reception of the signal impulse which is detected by the pulse-receive relay 142. Accordingly, if the impulse is received and relay 142 operated when the switch wipers reach #10 contacts, the operation of relay 154 energizes relay 143 which locks up to battery through its left hand armature and front contact and to ground through its right hand armature and front contact, and the bank contacts #10 to #14 of level 133 and associated wiper to ground at the right hand outer armature and front contact of one of the selection relays 121 to 124. Since the selection relays are not energized at any station except the transmitting station, the answer-back relays at the other stations are not operated. The operation of the left hand armature of the relay 143 removes the short-circuit around the indicator lamp 147, and said lamp is lighted to indicate at the transmitting station 1 that the recorder at station 2 has been selected and conditioned for operation, and is within transmitting range. Similarly answer-back relays 144, 145 and 146, if operated by the reception of properly timed pulses from stations 3, 4 and 5, control the lamps 148, 149 and 150 respectively to indicate that the last-mentioned stations are within range and conditioned to record a message from station 1. If any of the said stations are not selected to record a message by station 1, no control impulse will be transmitted as the switch wipers engage corresponding bank contacts #10, #11, #12 or #13 as will be described hereinafter, and thus relay 142 is not operated to control the answer-back relays corresponding to the stations which are not selected. As the rotary control switch completes its revolution, the answer-back relays 143—146 are restored by opening the described locking circuit at the contacts of the selection relays 121—124, which have been de-energized by the operation of relay 155 when the switch wiper of level 134 engages #14 bank contact.

As described above, when station 1 is transmitting the operating magnet 161 of the facsimile transmitter 107 is energized when the wiper of level 134 of the control switch engages the #13 bank contact, whereupon the transmitter sends out a series of phasing pulses applied to conductor 109 followed by the modulation signal current produced by scanning the message in the transmitter in accordance with usual practise. The recorder at each selected station is phased in response to the phasing pulses and then records the message. The contacts 162 of the transmitter 107 remain closed until the message is transmitted and maintain the control relay 102 of the radio transceiver operated to "send" position during transmission of the facsimile message.

When during transmission from station 1 the wipers of the control switch reach the #14 bank contacts, a circuit is closed from ground through the wiper of level 134 of the switch for energizing relays 155 and 156 in parallel. Upon energization, said relays become locked up through their right hand inner armatures and front contacts to ground at the inner left hand armature and front contact of relay 153 until transmission of the current message has been completed. The operation of relays 155 and 156 opens the selection and control circuits as described above so that only the facsimile apparatus at the transmitting station and selected receiving stations is operative until the system is released for another transmitting cycle (except at monitor station 1 which is operative to receive whenever it is not transmitting a message). The switch wipers of the rotary control switch are stopped in the home position by the latch of the release magnet 135 until another transmitting cycle is initiated.

At the end of transmission, the opening of contacts 162 on the facsimile transmitter 107 interrupts the holding circuits of relays 102 and 153, whereupon these relays become de-energized. The contacts 162 may also be arranged to unlock the transmitter start magnet 161 to stop the transmitter. The release of relay 102 renders the receiver unit of radio transceiver 100 operative; and the de-energization of relay 153 opens the locking circuits of relays 155 and 156 and recloses the circuit of the talk key 104. The de-energization of relays 155 and 156 restores the control equipment to normal in readiness for another transmission. When station 1 has been recording a message from one of the other stations, the opening of the right hand contacts of carrier relay 151 at the end of the message interrupts the locking circuit of relay 153 to restore the control equipment to normal as described above.

*Detailed description—stations 2 to 5*

The radio, facsimile and control apparatus at stations 2, 3, 4 and 5 is similar in most respects to that at station 1, and consequently the following description will be limited in large part to the differences in the circuits and operating functions.

When station 1 selects station 2 for reception of a message, as described above, actuation of the start key 130 at station 1 transmits a control pulse over the radio channel at the instant the rotary control switch at station 1 is started, and further impulses are transmitted when the switch wipers engage bank contacts #1, #2, #3, #4 and #5 as has been explained. The initial or start pulse releases the rotary control switches at stations 2, 3, 4 and 5 as described hereinafter so that the switch at each station makes a complete revolution, the rotation of all switches being synchronized as already explained.

At station 2, the control or start pulse radiated from station 1 operates pulse relay 242, connected through the filter and rectifier unit 241 to the receiver of the radio transceiver 200. The operation of relay 242 closes a circuit from ground through the wiper and home contact of level 231 of the control switch, the right hand outer armature and front contact of relay 242 and the right hand outer armature and back contact of relay 253 for operating the release magnet 235 of the control switch. In a similar manner, the simultaneous operation of the pulse relays 342, 442 and 542 at stations 3, 4 and 5 simultaneously releases the control switches at said stations by energization of the release magnets 335, 435 and 535 respectively.

When station 1 is transmitting, the remaining stations are immediately locked out by the transmission of a second control pulse when the switch wipers engage the #1 contacts. The means for transmitting the pulse at this time from station 1 has been described above in connection with Figs. 1 and 2. When the pulse is received at station 2, relay 242 operates and a circuit is closed from ground through the wiper and #1 contact of level 234 of the control switch, the inner right hand contact of relay 242 and the windings of relays 255 and 256 in parallel. Relays 255 and 256 become energized and open the circuits of the selecting keys and relays at station 2 to prevent the station selection function from being started or effected; and said relays become locked up through their right hand armatures and front contacts to ground at the inner left hand armature and front contact of relay 253. Relay 253, as explained above, corresponds to relay 153 at station 1 and is operated as soon as the rotary control switches are started and remains operated until the system is released at the end of the transmission of the message. Thus, if the operator at station 2 had actuated some of the selection keys 211 to 214 or the start key 230, the fact that station 1 was preparing to transmit simultaneously causes the equipment at station 2 to be locked against the station selection and transmitting functions. In a similar manner the selecting and transmitting equipment at stations 3, 4 and 5 are locked out if station 1 transmits a control pulse when the control switch wipers are in engagement with the #1 contacts. Similarly, station 2 locks out stations 3, 4, and 5, station 3 locks out 4 and 5, and station 4 locks out 5 in case two or more of these stations attempt to transmit at the same time as will be explained. After the transmitting cycle is started by any station, the control equipment at all other stations is disabled insofar as starting transmission is concerned until the end of the message transmitting cycle.

If station 1 had not been transmitting and none of the selecting keys of station 2 had been operated, the selection and transmitting equipment at station 2 is also locked out as soon as the switch wipers engaged the #2 contacts so that the operator at station 2 is prevented from accidentally making a partial selection after the operation of the control switches has been initiated by station 3, 4 or 5. When the switch wipers engage the #2 contacts, a circuit is closed from ground through the wiper and #2 contact of level 234, the inner left hand armatures and back contacts of relays 221, 222, 223 and 224 and the windings of relays 255 and 256 in parallel to lock out the station selecting and transmitting equipment as described above.

If station 2 has been selected for receiving a message by station 1, a control pulse is transmitted by station 1 as described above when the wipers of the control switches engage the #5 bank contacts. When this control pulse operates pulse relay 242 at station 2, a circuit is closed from ground through the wiper and #5 switch contact of level 234, the second right hand armature and front contact of relay 242 and the left hand inner armature and front contact of relay 255 for operating cut-in relay 266. Relay 266 becomes energized and locks up through its right hand armature and front contact to ground at the left hand inner armature and front contact of relay 253. At its left hand armature and front contact relay 266 closes the start circuit of the facsimile recorder 208, energizing the start magnet 263. The facsimile recorder 208 is also provided with contacts 264 which may be actuated manually to turn on the recorder when the station is not selected. Thus, if the operator notes the lighting of the busy lamp 236 and wants to record the message whether selected or not, he may hold the contacts 264 closed until a message or a part of the message has been recorded. On the other hand the contacts 264 may be operated automatically to lock the recorder in during the transmission of the message as described below in connection with Figs. 16 to 18.

When station 2 has been selected and rendered operative for receiving a message as described above, an answer-back signal will be transmitted from station 2 by operation of the relay 240 when the wipers of the control switch engage the #10 contacts. At this time the circuit of the relay 240 may be traced from the winding of the said relay to the wiper and #10 bank contacts of level 232 of the control switch to ground at the left-hand armature and front contact of the cut-in relay 266. Obviously if the recorder had not been rendered operative to record the message by operation of the cut-in relay 266, no answer-back signal pulse would be sent out at this time. The transmission of the answer-back pulse over the radio channel from the source 239 operates the answer-back relay and signal lamp at the transmitting station as described above in connection with Figs. 1 and 2.

When station 1 is idle and station 2 is transmitting, the latter sends out a control pulse when the control switch wipers engage the #2 contacts in order to lock out stations 3, 4 and 5. At this time the circuit of the pulse relay 240 may be traced from the winding of said relay through the wiper and #2 contact of level 232 of the control switch to ground at the right-hand outer armature and front contact of any of the selection relays 221 to 224 that may have been operated. This control pulse is operative to lock out stations 3, 4 and 5 in the same manner as described above in locking out station 2 from station 1. Assuming that station 2 is transmitting as stated, relay 240 is operated to send out control pulses when the wiper of switch level 232 engages the #6, #7 and #8 bank contacts to cut in the recording equipment of stations 3, 4 and 5 or any of them, depending upon whether selection keys 212, 213 and 214 had been operated. The keys 212, 213 and 214 differ from the key switches at station 1 in that an extra pair of contacts is provided in parallel to the contacts of selection key 211 so that selection relay 221 representing station 1 is always operated when any of the selecting keys 212 to 214 are operated (station 1 being a monitor station which records every message from the other stations, whether selected or not).

When the wiper of level 234 of the control switch engages the #9, #11, #12 and #13 contacts, circuits are closed for operating the answer-back relays 243 to 246 representing stations 1, 3, 4 and 5 as described above in connection with station 1. A circuit is also closed when the wiper of level 234 engages the #13 contact through the outer left-hand armature and front contact of any operated one of the selection relays 221 to 224 to the start magnet 261 in the facsimile transmitter 207 for starting the transmitter. When the switch wiper of level 234 engages the #14 bank contact, a circuit is closed through the windings of relays 255 and 256 in parallel for locking out the selection equipment which has already functioned and for disconnecting the busy tone source 265 from the contacts of relays 240 and 252. The answer-back relays 243 to 246 remain locked up through their right-hand armatures and front contacts to the bank contacts #9 to #14 of the level 233 of the control switch or until the control switch wipers reach their normal or home position. When the facsimile transmission is completed the opening of the transmitter contacts 262 opens the locking circuit of relay 253 whereupon the control equipment is restored to normal as described above in connection with station 1.

Figure 5:
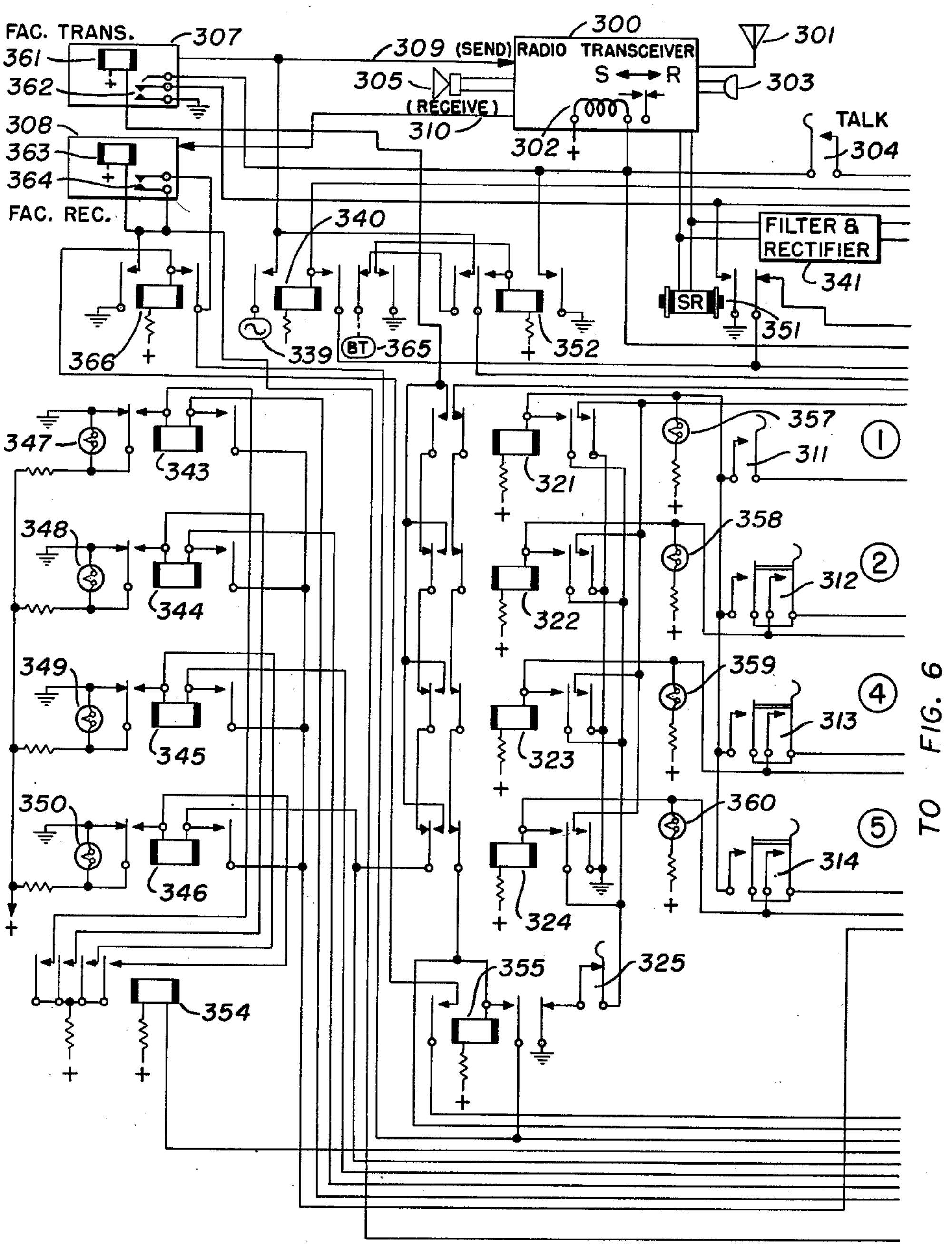
Figure 6:
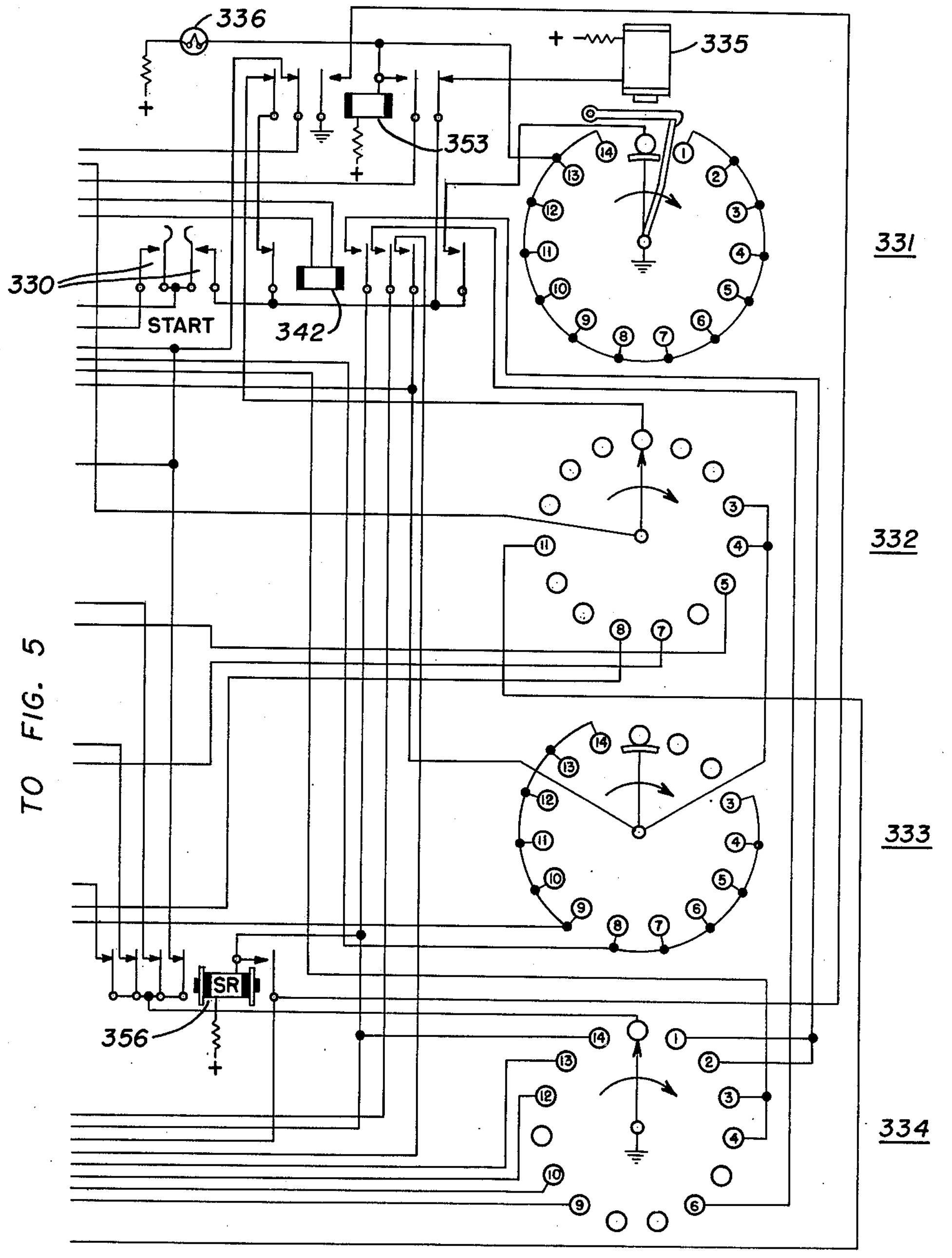
Figure 7:
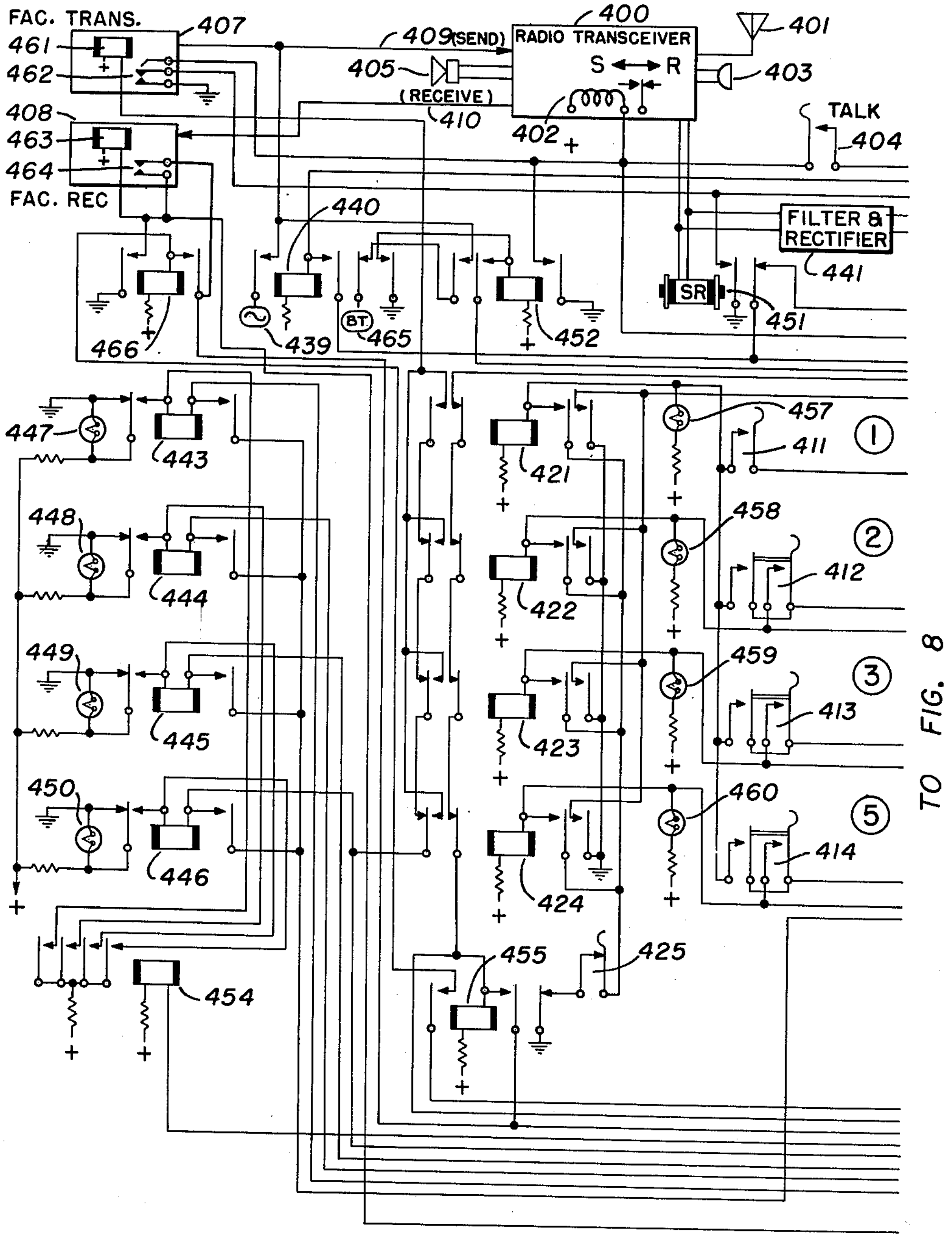
Figure 8:
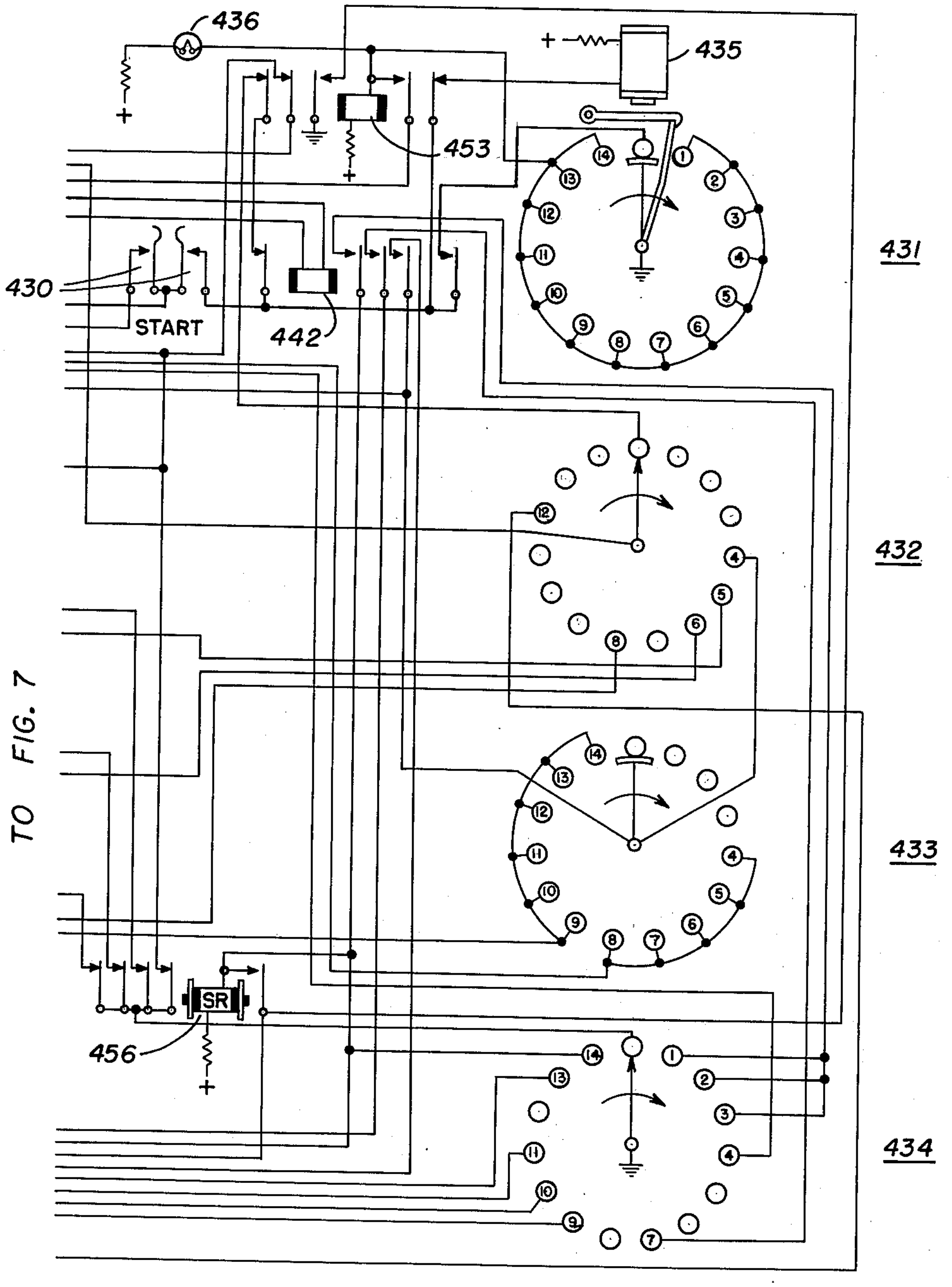
Figure 9:
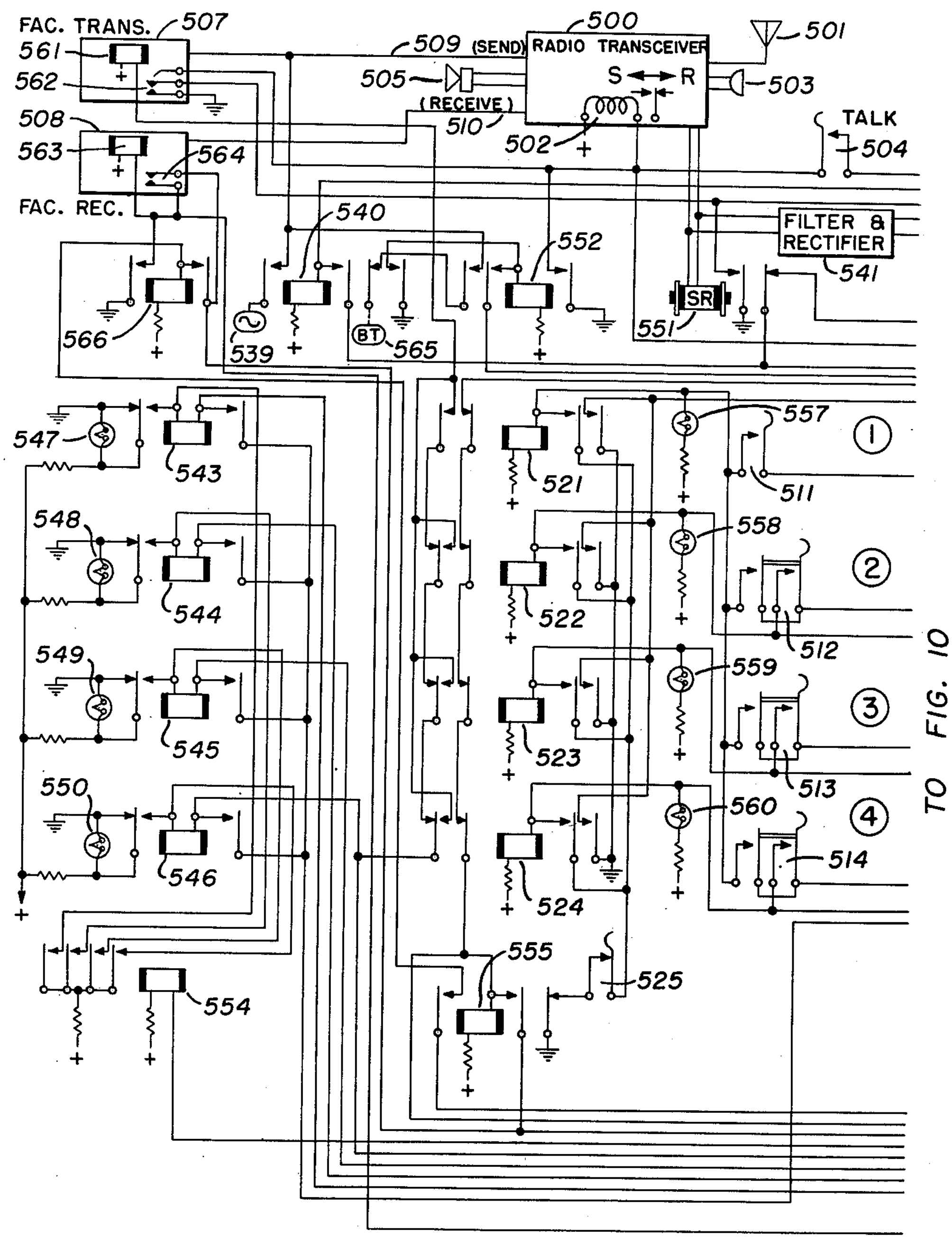
Figure 10:
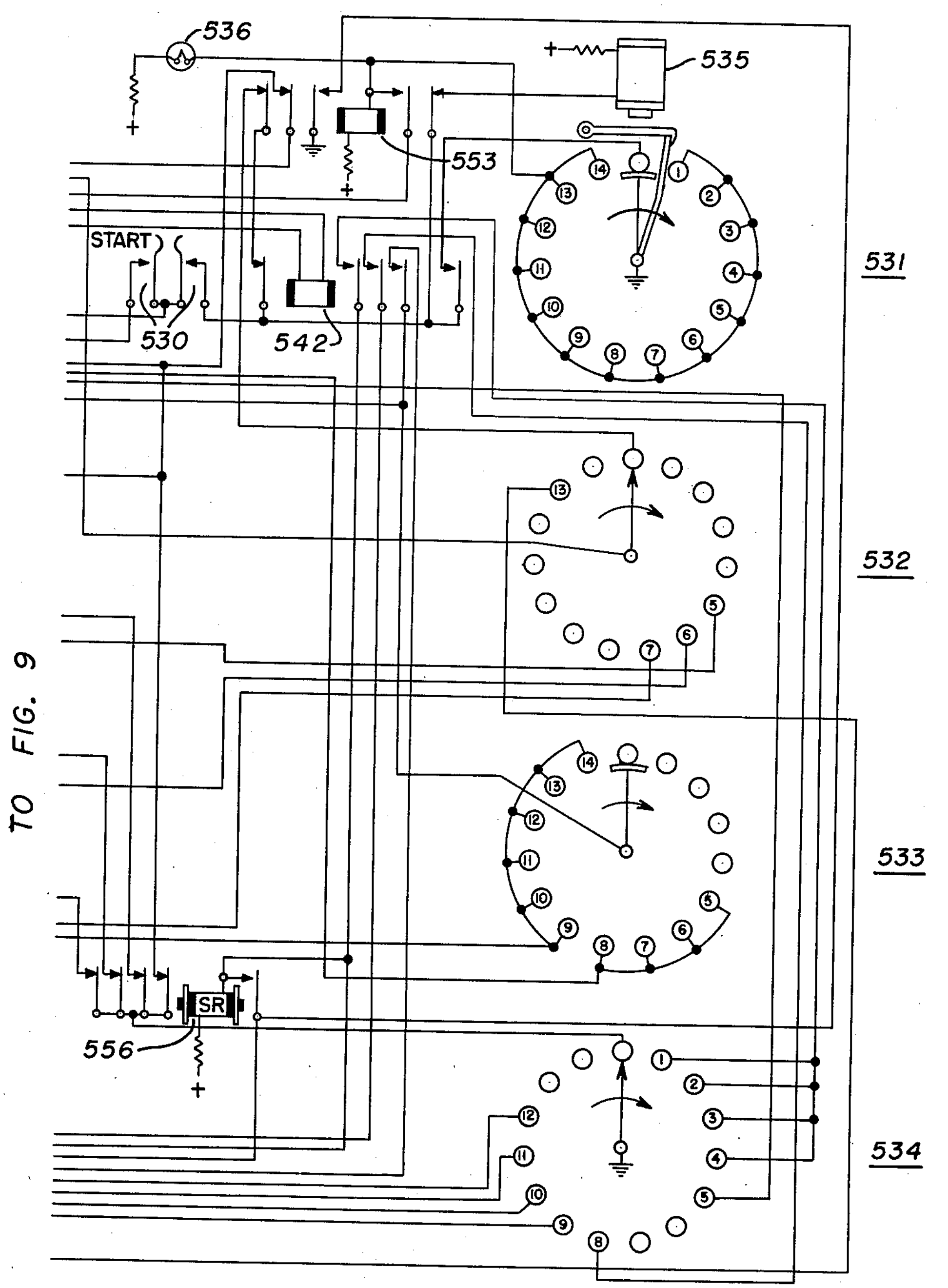
Figure 11:
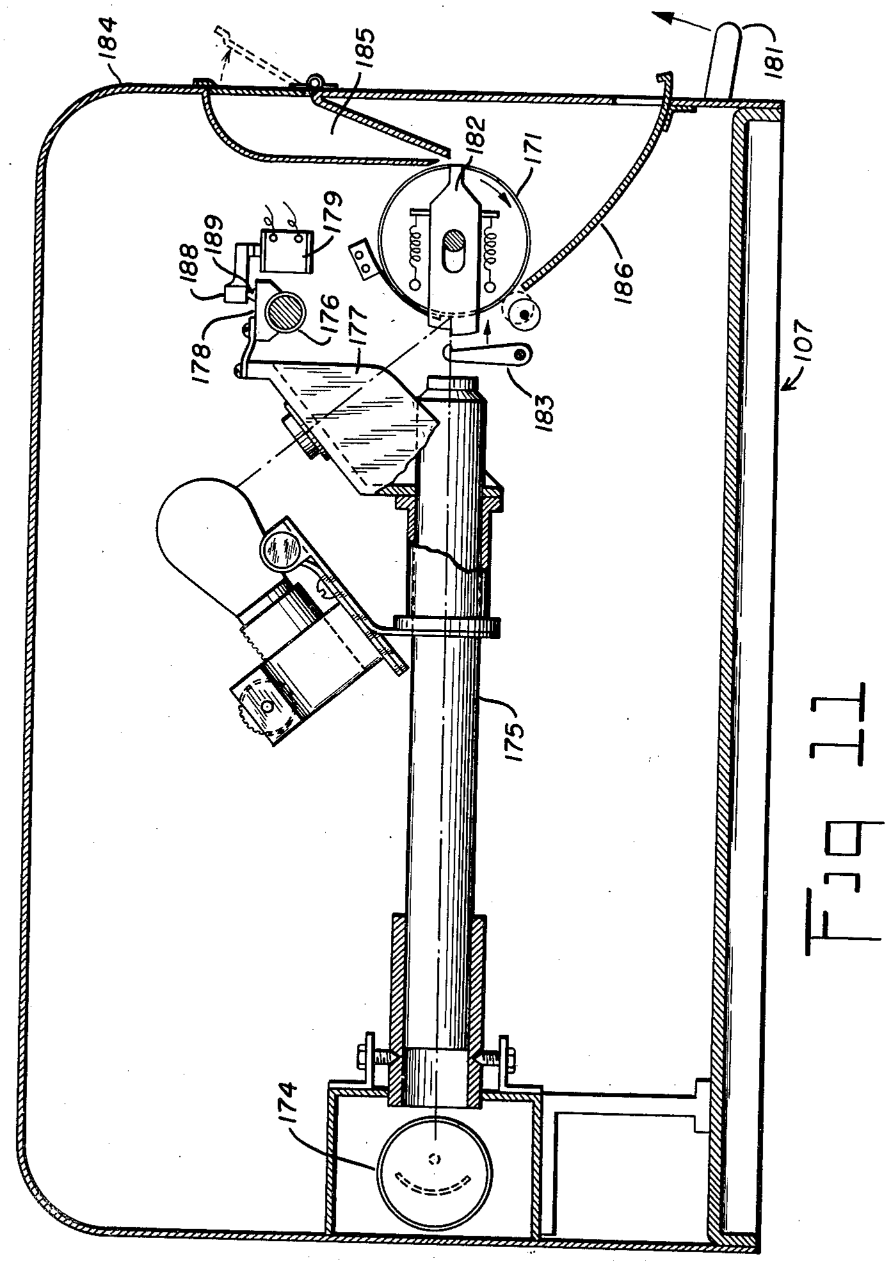
Figs. 11–15 illustrate a preferred form of facsimile transmitter that may be used in the system shown in Figs. 1–10.
Figure 12:
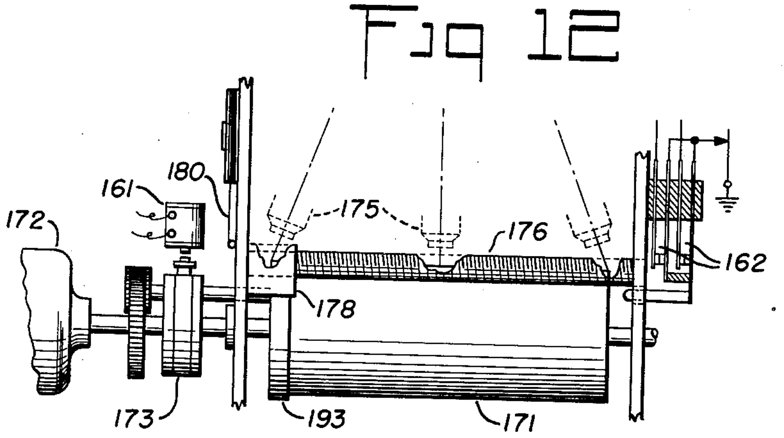
Figure 13:
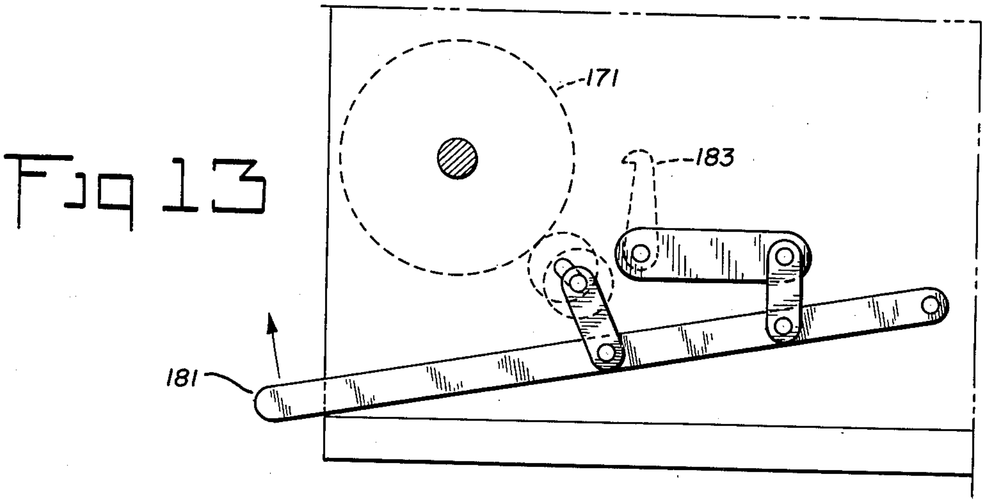

The operation of the control equipment at station 3, Figs. 5 and 6, is similar to station 2 except that the selection keys 311 to 314 with their associated lamps 357 to 360 and the answer-back relays 343 to 346 and the associated lamps 346 to 350 represent stations 1, 2, 4 and 5 respectively; and the control relays are connected to different contacts of the control switch to transmit or to be responsive to the properly timed control pulses required for station 3. Thus the #1 and #2 bank contacts of level 334 are connected to the contacts of the pulse relay 342 so that the transmitting function of station 3 can be locked out by either station 1 on bank contact #1 or station 2 on bank contact #2. On the other hand if neither station 1 nor station 2 is transmitting, station 3 when transmitting sends out a control pulse when the wiper of level 332 engages the #3 bank contact of the control switch as described above in connection with stations 1 and 2 to lock out the other stations. It will also be noted that the selecting keys 312 to 314 are connected in proper order to the bank contacts of level 332, contact #6 representing station 3 being blank at station 3. Similarly the answer-back relays 343 to 346 are connected to contacts #9, #10, #12 and #13 of the level 334 of the control switch, #11 corresponding to station 3 being blank at station 3. In a similar manner the selecting keys and answer-back relays at stations 4 and 5 are connected to the proper bank contacts of the levels 432, 532 and 434, 534 of said switches in such a manner as to affect the control and answer-back functions in proper sequence, as shown. The keys and answer-back relays as well as the signal lamps at station 4 represent, of course, the remote stations 1, 2, 3 and 5; and at station 5 the remote stations 1, 2, 3 and 4. Station 5 further differs from stations 1 to 4 in that it does not send out any lockout control pulses during the initial traverse of the wipers of the control switch since it is arranged to transmit only if stations 1 to 4 are not transmitting as described above.

At station 3 the facsimile recorder 308 is cut in on a control pulse received at station 3 when the switch wipers are in engagement with the #6 bank contacts, in the same manner that station 2 was cut in upon the reception of a control pulse when the wipers of the switch at station 2 engage the #5 bank contacts. Similarly the facsimile recorder at station 4 is cut in if a pulse is transmitted from one of the other stations on the #7 position of the control switch and likewise station 5 on the #8 position of the control switch. The facsimile transmitter at each of the stations 3, 4 and 5 is cut in, in the event that selection relays 321 to 324, 421 to 424 or 521 to 524 have been operated, when the switch wipers of the control switch engage the #13 bank contacts as described above in connection with station 2. Thus it will be obvious that more than five stations can be selectively controlled by providing additional contacts on the rotary control switches and an additional set of key switches and relays for each such additional station.

The answer-back function of the control system serves to confirm the selection of a wanted station and the fact that such station is within operating range of communication. Since it does not affect the selecting function of the system in any way, either the switching and relay control equipment required for the selecting or for the answer-back functions may be omitted if desired, thus reducing the size of the control switches and auxiliary relay equipment.

*Facsimile equipment*

The facsimile transmitter and recorder may be of the conventional type and include electromagnetic starting and phasing mechanism to enable automatic starting and stopping of the machines, as well understood in the art. The transmitter, for example, may be similar to that shown in the prior patents to Austin G. Cooley et al., Nos. 2,138,784 and 2,246,721, or the copending application of Austin G. Cooley, Ser. No. 721,085 filed January 9, 1947 issued as U. S. Letters Patent #2,524,651, October 3, 1950. The recorder is preferably of the continuous or roll-feed type, similar to that shown in the prior patent to Austin G. Cooley No. 2,260,511 or in the co-pending applications of A. G. Cooley et al. Ser. No. 679,703 filed June 27, 1946 or Ser. No. 728,865 filed Feb. 15, 1947, now Patent No. 2,591,138, granted April 1, 1952, assigned to the assignee of the present application.

Figs. 11 to 18 illustrate the general structural details of typical facsimile equipment for use with the system shown in Figs. 1 to 10. Referring to Figs. 11 to 15, the facsimile transmitter comprises a rotatable drum 171 upon which the copy to be transmitted is mounted in the usual manner. The drum 171 is driven by a motor 172 through a friction clutch 173 controlled by the start magnet 161. The transmitter further comprises a scanning system including a photocell 174 and a pivoted lens tube 175 which is fed along the length of the drum 171 to scan the copy by a feed screw 176, as indicated in dotted lines in Fig. 12. As shown a bracket 177 on the lens barrel carries a threaded half-nut 178 adapted to engage the feed screw. In order to engage and disengage the half-nut 178 with the feed screw 176, a magnet 179 is provided which is arranged to depress the half-nut 178 into engagement with feed screw 176 when the magnet is energized. When the magnet becomes de-energized, the spring supported half-nut 178 lifts off the thread on the feed screw and is pulled back to the initial position by the spring return wire or cable 180. When the half-nut 178, which is fed from left to right by the feed screw as viewed in Fig. 12, reaches the end of the drum, it opens the contacts 162 to restore the control mechanism to normal as described above.

In loading the drum with copy, the lever 181 is raised, thereby stopping the rotation of the drum and actuating the drum clamp 182 by means of the pivoted lever 183, as explained more fully in the above-mentioned U. S. Letters Patent #2,524,651. The cover 184 is shown as provided with a loading chute or inlet 185 and a guide apron 186 for returning the sheet released from the drum at the end of transmission. However, any suitable copy loading and unloading means may be employed in lieu of that shown.

Figure 14:
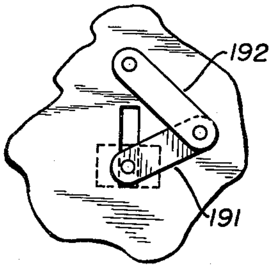
Figure 15:
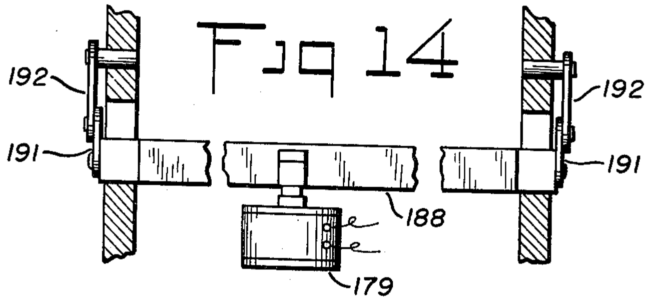

As shown in Figs. 14 and 15, the drum feed control magnet 179 has its armature attached to a horizontal bar 188. The bar 188 is movably supported parallel to the drum and is disposed above the half nut 178 in position to engage the projection 189 thereon when the magnet is energized. The bar 188 is mounted at each end on a pair of pivoted links 191 and 192 to reduce friction while maintaining the bar 188 substantially parallel with the feed screw 176. It will thus be seen that when the drum 171 is loaded with copy to be transmitted, the release of the clutch 173 by energization of the magnet 161 will effect rotation of the drum 171 and feed screw 176. The drum 171 being provided at the left hand end with a raised or painted phasing ring 193 in front of the lens barrel 175, phasing impulses will be sent out as long as the optical system is scanning the ring 193 as well understood by those skilled in the art. Upon energization of the magnet 179, the scanning system is fed along the length of the drum in the usual manner by engagement of the half nut 178 with the leadscrew 176. At the end of a message the contacts 162 are opened to stop and disconnect the transmitter. For a fuller description of the construction and operation of this particular type of transmitter, reference may be had to U. S. Letters Patent #2,524,651 which claims to the transmitter per se.

The recorder 108 shown in Figs. 16 and 17 is similar in structural detail to that shown in the copending application of A. G. Cooley, Ser. No. 728,865 and certain features are also described and claimed in the prior application of Cooley et al., Ser. No. 679,703, referred to above. The recorder comprises a plurality of travelling styli 271 carried by a flexible belt 272, the movement or travel of which is synchronized with the transmitting scanner in the usual manner. The belt 272 is supported and guided by the two wheels 273 and 274 mounted in such a manner that one span of the belt lies parallel to the surface of the recording paper 275. A bar magnet 276 beneath the recording sheet holds the stylus 271 in uniform contact with the surface of the sheet as its traverses the same. A stationary guide plate 286 for the styli 271 may also be provided. The belt or band 272 preferably has gear teeth formed in one edge thereof, said teeth being adapted to mesh with a motor-driven drive gear 277. The recording current is supplied to each stylus 271 through a contact bar 278 which is in a position to contact the offset rear end of the particular stylus 271 engaging the recording sheet. As shown, the recorder is housed in a casing 279 which is provided with a window 280 for viewing the copy as it is recorded and fed out by the rotating driven feed roll 281. For a more complete description of the structural details and operation of the recorder 108, reference may be made to the above-mentioned copending applications Ser. Nos. 679,703 and 728,865. Moreover other types of recorders, if adapted for automatic starting and phasing, may be employed if desired.

The starting and phasing of the recorder may be effected by conventional means, well known in the art. As shown, the driving motor which is assumed to be continuously operating is connected through a friction clutch 287 to the drive gear 277. The rotation of the drive gear 277 is controlled by a phasing magnet 283 provided with a hinged armature 284 adapted to engage a notched cam or disc 285 (see Figs. 16 and 18) rotating with the drive gear 277. Thus the drive gear and associated belt 272 are stopped in a predetermined position and released upon the reception of a phasing pulse to phase the styli 271 with respect to the recording sheet at the commencement of a transmission. The driving motor operates at constant synchronous speed corresponding to that of the transmitter so that phasing is only necessary at the start of recording.

The recording input circuit may be transferred from the phasing magnet to the stylus by a timer such as a commutator driven by the recorder motor and started by the start magnet 163. Thus, as indicated in Fig. 18, the timer mechanism 290 controlled by magnet 163, may be arranged to operate phasing magnet 283 and control relay 291 to phase the cam 285 during the reception of one or more phasing pulses which occur a predetermined time after operation of relay 163. Then the timer 290 releases relay 291, thereby connecting the input conductor 110 to the recording amplifier 292 and stylus. The phasing circuit 293 is arranged to convert a positive or negative signal pulse from the transmitter into a strong phasing pulse for operating the phasing magnet 285, as well understood in the art. A magnet 295 is shown as connected to the signal amplifier to hold the contacts 264 closed as long as message signals are received. As previously explained, the contacts 264 may be arranged to operate the recorder start magnet 163 when manually closed, and lock up the said magnet until manually reset or released by coil 295 after the message is recorded.

Various modifications may be made in the specific embodiment of the invention described above without departing from the scope thereof.

I claim:

1. A multi-station message transmission and receiving system of the kind described, comprising in combination, a plurality of stations each provided with a radio transmitter and with a radio receiver, all said stations arranged to operate on the same interstation carrier frequency and each station being arranged to act as a transmitter to any one or more of the other stations, message recording means at each station, means at each station for rendering the recording means thereat responsive to signals received by the associated radio receiver, means controlled by the radio transmitter at any particular station and by the radio receiver at a wanted station or stations for selecting said wanted station or stations, the last-mentioned means including circuit connections for locking out the unwanted stations against transmission and reception from said particular station, and means including the radio transmitter at said particular station and the radio receiver and message recording means at said wanted station or stations for sending and recording a message only at said wanted stations by way of said carrier frequency.

2. In a multi-station message transmitting system of the character described, a plurality of stations, each provided with a radio-frequency transmitter and receiver, all of said transmitters and receivers operating on the same carrier frequency, message recording means at each station, means including the radio-frequency receiver at each station for controlling the recording means thereat, and means for broadcasting messages from any of said stations but only to the wanted station or stations on the said carrier frequency while excluding the other stations from transmission or reception.

3. In a multi-station message transmitting system of the character described, a plurality of three or more stations, each provided with a radio-frequency transmitter and receiver, all of the said transmitters and receivers operating on the same carrier frequency, voice transmitting and receiving means at each station, message recording means at each station, remote control means for disabling the voice transmitting means when the message recording means is in use and means for effecting either record message or voice communication as desired between the respective stations on said carrier frequency.

4. In a system of the character described, two stations, each of which includes radio transmitting and receiving apparatus, means for operating on the same carrier frequency for both transmitting and receiving at both stations, said carrier frequency being suppressed during idle periods, telegraph transmitting and recording apparatus at each station associated with said radio apparatus, means for locking out one station from transmitting on said carrier frequency in response to the transmission of the carrier from the other station, means for thereafter transmitting a timed carrier pulse from said one station and means controlled by said pulse for conditioning the recording apparatus at the other station for reception.

5. In a system of the character described, two stations, each of which includes radio transmitting and receiving apparatus arranged to modulate and demodulate the same radio-frequency carrier shared by both stations, said carrier being suppressed during idle periods, a facsimile recorder at each station, means for initiating transmission by said radio apparatus at will and means responsive to the radiation of the carrier from the station initiating transmission for preventing transmission from the other station and for initiating a scanning cycle of the facsimile recorder at said other station.

6. In a multi-station message transmitting system of the character described, a plurality of three or more stations, each provided with a radio-frequency transmitter and receiver, all of said transmitters and receivers operating on the same carrier frequency, the radio-frequency carrier being off whenever the transmitters are not transmitting modulated carrier or signals, message transmitting and recording means at each station connected to said radio-frequency carrier equipment, means responsive to the radiation of the carrier at a station desiring to transmit for locking out the remaining stations against operation as transmitters, means responsive to the carrier frequency for selecting the wanted station or stations to receive the message, and means for subsequently transmitting the message from the transmitting station to the selected receiving stations by modulation of said carrier.

7. In a multi-station message transmitting system of the character described, a plurality of three or more stations, each provided with a radio-frequency transmitter and receiver, all of said transmitters and receivers operating on the same carrier frequency, telegraph transmitting and recording means at each station connected to said radio-frequency carrier equipment, means responsive to the radiation of the carrier from a station desiring to transmit for preventing more than one transmission at the same time from the other stations, means responsive to the carrier for conditioning the telegraph recording means at wanted stations only for receiving the message, and means for transmitting the message to the selected receiving stations by modulation of the carrier and for subsequently releasing the system for control by another transmitting station.

8. In a multi-station message transmitting system of the character described, a plurality of three or more stations, each provided with a radio-frequency transmitter and receiver arranged to modulate and demodulate the same carrier frequency shared by all said stations, facsimile telegraph transmitting and recording equipment at each station connected to the radio-frequency carrier equipment, means responsive to the initiation of a transmission from one station for locking out others of said stations from the normal operable condition, means responsive to said carrier frequency for thereupon selecting from said one station the wanted receiving station or stations for recording the message by rendering the recording equipment at selected stations operative, and means for subsequently restoring the system to normal for other transmissions from the same or other stations.

9. In a multi-station message transmitting system of the character described, a plurality of three or more stations, each provided with a radio-frequency transmitter and receiver arranged to modulate and demodulate the same carrier frequency, a constant-speed rotary control device at each station, means responsive to said carrier frequency for releasing said device for a control cycle when the system is changed from the idle to the busy condition by initiating the transmission of a message from one of the stations, means including said device for controlling the transmitting equipment at each of the stations other than said one transmitting station to prevent transmission from said other stations during the message, and means for restoring the system to normal after the message has been transmitted.

10. In a multi-station message transmitting system of the character described, a plurality of three or more stations, each provided with a radio-frequency transmitter and receiver arranged to modulate and demodulate the same radio frequency carrier shared by all of said stations, telegraph message transmitting and recording means at each station, control means including synchronized rotary switch contacts at each station for controlling the operativeness of the message transmitting and recording means thereat, means to operate each rotary switch through a complete cycle whenever it is started from its normal position, means to synchronize the movement of the contacts of the respective switches, and means for releasing said rotary switches for a control cycle in response to the radiation of a carrier from a station desiring to transmit.

11. In a multi-station message transmitting system, a plurality of stations, message transmitting and recording equipment at each station, carrier-wave channels for message communication with said equipment between said stations and means operative over said channels for selecting from any station using its message transmitting equipment the wanted receiving station or stations at which the message is to be recorded, said selecting means including synchronized rotary switches at the respective stations, and local synchronized motor means for driving each of said switches through an operating cycle at the same speed to maintain synchronism solely by the speed of said motor driving means.

12. In a multi-station message transmitting system, a plurality of stations, each including a radio-frequency transmitter and receiver arranged to modulate and demodulate at the same carrier frequency shared by all of said stations, message transmitting and recording equipment at each station, carrier control means including selecting keys at each station representing the other stations, a multiple-contact control switch at each station, means including said carrier control means whereby the keys at any station operating as a transmitting station control the switches at the other stations over the channel represented by the radio-frequency carrier, and means including said keys, control switches and message equipment for effecting message recording at selected ones of said stations by said radio-frequency carrier.

13. In a multi-station message transmitting system, a plurality of stations, each including a radio-frequency transmitter and receiver arranged to modulate and demodulate on the same carrier frequency shared by all of said stations, record-message transmitting equipment at each station for controlling the radio-frequency transmitter, message recording equipment at each station controlled by the radio-frequency receiver, and means including locally synchronized control switches at each station for utilizing said radio-frequency carrier to effect recording of a message from any one of said stations at selected ones of the other stations and for effecting a desired control function at the other unselected stations.

14. In a multi-station message transmitting system, a plurality of stations, each including a radio-frequency transmitter and receiver arranged to modulate on and demodulate the same carrier frequency shared by all of said stations, record-message transmitting equipment at each station for controlling the radio-frequency transmitter, message recording equipment at each station controlled by the radio-frequency receiver, locally synchronized constant-speed rotary switches at each station adapted to rotate in synchronism, means for transmitting a signal on said carrier from a station desiring to transmit a message, means responsive to said signal for starting the rotation of said rotary switches in all of said stations, and locking out all except the calling station against message transmission selectively operable station-selection means at each station, and means including said station-selection means and said rotary switches for effecting non-interfering record communication between selected stations only on said single carrier frequency.

15. In a multi-station message transmitting system, a plurality of stations, each including a radio-frequency transmitter and receiver arranged to modulate on and demodulate the same carrier frequency shared by all of said stations, record-message transmitting equipment at each station for controlling the radio-frequency transmitter, message-recording equipment at each station controlled by the radio-frequency receiver, manually operable station-selection means for controlling said radio-frequency carrier to select wanted stations for reception of a message, and selective control relay means connected to each of said radio-frequency receivers to condition the selected message-recording equipment for operation and to lock out all except the calling station against message transmission.

16. A message transmitting system according to claim 15 in which the station-selection means includes a start key arranged to radiate a signal by said radio-frequency carrier to indicate that transmission of a message has been initiated and means responsive to said signal to prevent transmission from another of said stations until completion of said message.

17. In a multi-station message transmitting system, a plurality of stations including a main or monitoring station and substations, each of said stations including a radio-frequency transmitter and receiver arranged to modulate and demodulate on the same carrier frequency shared by all of said stations, record-message transmitting equipment at each station for controlling the radio-frequency transmitter, normally inoperative message-recording equipment at each station controlled by the radio-frequency receiver, manually operable station-selecting means at certain stations for utilizing the radio-frequency carrier to select wanted stations for reception of a message, means at said substations responsive to said station-selecting means to condition the message-recording equipment thereat for reception of a message when the particular substation has been selected and means at the main or monitoring station to condition the message-recording equipment thereat for reception of all messages transmitted by any of the substations.

18. A facsimile radio broadcast system comprising a plurality of stations, each provided with message transmitting and recording equipment of the facsimile telegraph type and radio-frequency carrier apparatus for transmitting facsimile signals between said stations, means for sending a control signal from any one of said stations which desires to transmit a message, means for thereupon sending answer-back signals from others of the stations to indicate that they are within effective range of the transmitting station, and control apparatus at each station responsive to said control signal for preventing message transmission, except from the station initiating a call by transmitting said control signal, until the call is completed.

19. A facsimile radio broadcast system comprising a plurality of stations, each provided with message transmitting and recording equipment of the facsimile telegraph type and radio-frequency carrier apparatus for transmitting facsimile signals between said stations, means for sending a control signal from any one of said stations which desires to transmit a message, said means including a rotary control switch and a manually operable key switch, and means at the other stations responsive to said control signal to render the facsimile recording equipment operative at one or more wanted stations and to lock out as a transmitter any station except the calling station.

20. In a multi-station facsimile message transmitting system, in combination, a plurality of three or more stations, each provided with facsimile transmitting and/or recording apparatus, communication facilities for message transmission with said transmitting and recording apparatus between said stations, a multi-contact control switch in each station, means for initiating transmission of a message from any of said stations and means responsive thereto for selecting a wanted receiving station or stations by conditioning the recorders thereat for operation and locking out the transmitters at all stations except a calling station and the recorders at unwanted stations, said last-mentioned means including said control switches.

21. In a multi-station facsimile message transmitting system, in combination, a plurality of three or more stations, each provided with facsimile transmitting and/or recording apparatus, communication facilities for message transmission with said transmitting and recording apparatus between said stations, means for initiating a control cycle at any station desiring to transmit a message, rotary control switches at the respective stations each comprising a plurality of wipers and bank contacts including home contacts, means for operating said control switches in synchronism during each control cycle to effect successive engagement of the wipers with corresponding bank contacts in every station and means including said control switches for controlling the operativeness of the recording apparatus at stations other than the transmitting station in response to control impulses generated by the control switch at the transmitting station.

22. A telefacsimile system having a plurality of stations each of which is arranged to act as a transmitter to any one or more of the remaining stations, comprising in combination, facsimile transmitter apparatus and facsimile receiver apparatus at each station, means for transmitting a radio frequency carrier wave from any particular station as a transmitter to any one or more of the remaining stations to alternately start the facsimile receiving apparatus at each of said remaining desired stations and to phase said facsimile apparatus at said remaining desired stations with the facsimile apparatus at said particular transmitting station, and means including automatic step-by-step switch means at each station for enabling said particular transmitting station to lock the facsimile apparatus at any undesired station against reception of a facsimile message from said particular transmitting station.

EARL RADFORD EVANS.

REFERENCES CITED

The following references are of record in the file of this patent:

UNITED STATES PATENTS

| Number | Name | Date |
|---|---|---|
| 1,523,377 | Brady | Jan. 13, 1925 |
| 1,678,973 | Brown | July 31, 1928 |
| 1,900,499 | Hershey | Mar. 7, 1933 |
| 2,064,905 | Green | Dec. 22, 1936 |
| 2,148,430 | Benjamin | Feb. 28, 1939 |
| 2,184,387 | Kiner | Dec. 26, 1939 |
| 2,248,746 | Davis | July 8, 1941 |
| 2,265,056 | Bowers | Dec. 2, 1941 |
| 2,301,475 | Suren et al. | Nov. 10, 1942 |
| 2,351,621 | Light | June 20, 1944 |
| 2,357,297 | Wack et al. | Sept. 5, 1944 |
| 2,363,583 | Gilman | Nov. 28, 1944 |
| 2,416,699 | Kinkead | Mar. 4, 1947 |
| 2,427,670 | Goldsmith | Sept. 23, 1947 |
| 2,457,434 | Bartelink | Dec. 28, 1948 |
| 2,458,558 | Bradley | Jan. 11, 1949 |
| 2,469,555 | Hitchcock | May 10, 1949 |